United States Patent
Sabi

(10) Patent No.: US 9,123,960 B2
(45) Date of Patent: Sep. 1, 2015

(54) SOLID-STATE ELECTROLYTE BATTERY AND CATHODE ACTIVATING SUBSTANCE

(75) Inventor: Yuichi Sabi, Tokyo (JP)

(73) Assignee: SONY CORPORATION (JP)

( * ) Notice: Subject to any disclaimer, the term of this patent is extended or adjusted under 35 U.S.C. 154(b) by 186 days.

(21) Appl. No.: 13/505,236

(22) PCT Filed: Nov. 5, 2010

(86) PCT No.: PCT/JP2010/070154
§ 371 (c)(1),
(2), (4) Date: Apr. 30, 2012

(87) PCT Pub. No.: WO2011/062113
PCT Pub. Date: May 26, 2011

(65) Prior Publication Data
US 2012/0214064 A1    Aug. 23, 2012

(30) Foreign Application Priority Data
Nov. 18, 2009   (JP) ................................ 2009-263418

(51) Int. Cl.
*H01M 10/052* (2010.01)
*H01M 10/0562* (2010.01)
*H01M 4/485* (2010.01)
*H01M 4/525* (2010.01)
*H01M 4/58* (2010.01)

(52) U.S. Cl.
CPC .......... *H01M 4/5825* (2013.01); *H01M 10/052* (2013.01); *H01M 10/0562* (2013.01); *Y02E 60/122* (2013.01)

(58) Field of Classification Search
CPC .......... H01M 10/052; H01M 10/0562; H01M 4/485; H01M 4/525
See application file for complete search history.

(56) References Cited

U.S. PATENT DOCUMENTS

| | | | | |
|---|---|---|---|---|
| 2007/0172735 | A1* | 7/2007 | Hall et al. | 429/233 |
| 2009/0297935 | A1* | 12/2009 | Visco et al. | 429/144 |
| 2010/0261071 | A1* | 10/2010 | Lopatin et al. | 429/345 |

FOREIGN PATENT DOCUMENTS

| | | | | |
|---|---|---|---|---|
| CN | 1691380 | * | 11/2005 | |
| CN | 101481106 | * | 7/2009 | |
| JP | 2005-353320 | * | 12/2005 | ............. H01M 4/58 |

(Continued)

OTHER PUBLICATIONS

Official Action (with English translation) for Chinese Patent Application No. 201080051323.3 mailed Mar. 3, 2014, 16 pages.
Official Action (no English translation available) for Japanese Patent Application No. 2009-263418 mailed Nov. 26, 2013, 3 pages.

*Primary Examiner* — Barbara Gilliam
*Assistant Examiner* — Angela Martin
(74) *Attorney, Agent, or Firm* — Sheridan Ross P.C.

(57) ABSTRACT

The present invention provides a solid-state electrolyte battery using a cathode activating substance which functions as such in an amorphous state and has a high ionic conductivity and provides a cathode activating substance used for the same. This solid-state electrolyte battery includes a laminated body. In the laminated body, a cathode-side current collector film, cathode activating substance film, solid-state electrolyte film, anode potential formation layer and anode-side current collector film are stacked above a substrate in this order. The cathode activating substance film is made of $Li_xM_yPO_{4-z}N_z$, i.e., a lithium complex oxide in an amorphous state.

12 Claims, 16 Drawing Sheets

(56) References Cited

FOREIGN PATENT DOCUMENTS

| JP | 2007-508671 | 4/2007 | | |
| JP | 2008-542979 | 11/2008 | | |
| JP | 2010-517240 | 5/2010 | | |
| WO | WO 2006066470 | * | 6/2006 | ............ H01M 4/48 |
| WO | WO 2008/091707 | | 7/2008 | |
| WO | WO 2008/091707 A2 | * | 7/2008 | ............ H01M 4/58 |

* cited by examiner

A

B

SOLID-STATE ELECTROLYTE BATTERY AND CATHODE ACTIVATING SUBSTANCE

CROSS REFERENCES TO RELATED APPLICATIONS

The present application is a national stage of International Application No. PCT/JP2010/070154 filed on Nov. 5, 2010 and claims priority to Japanese Patent Application No. 2009-263418 filed on Nov. 18, 2009, the disclosure of which is incorporated herein by reference.

BACKGROUND

The present invention relates to a solid-state electrolyte battery and cathode activating substance. The present invention relates more specifically to a solid-state electrolyte battery including a solid-state electrolyte not containing any organic electrolytic solution and to a cathode activating substance used for the same.

A lithium-ion secondary battery relying on doping or dedoping with lithium ions offers excellent energy density, thus finding application, for example, in mobile electronic devices. Among such lithium-ion secondary batteries, energetic research and development efforts have been under way on all-solid-state lithium-ion secondary batteries using, as an electrolyte, a solid-state electrolyte not containing any organic electrolytic solution.

Development efforts on a thin film lithium ion secondary battery, i.e., one form of such an all-solid-state lithium-ion secondary battery, are continuing at a brisk pace. This thin film lithium ion secondary battery includes a current collector, activating substance and electrolyte that are formed by thin films. Each of the thin films making up a thin film lithium ion secondary battery is formed by sputtering, vapor deposition or other film formation method (refer, for example, to Non-Patent Document 1).

In a thin film lithium secondary battery, an amorphous material such as LiPON or LiBON is used as a solid-state electrolyte. LiPON is obtained by substituting nitrogen to $Li_3PO_4$, and LiBON is obtained by substituting nitrogen to $Li_xB_2O_4$. The ionic conductivity of these materials is about $10^{-6}$ S/cm which is significantly lower than that of an ordinary liquid electrolyte of $10^{-2}$ S/cm. In a thin film lithium secondary battery, the film thickness of the solid-state electrolyte is small (e.g., about 1 µm). As a result, the distance traveled by Li is short. Therefore, the solid-state electrolyte made of the above amorphous material having a low ionic conductivity can offer performance equivalent to that of liquid electrolytes.

In a thin film lithium secondary battery, on the other hand, the cathode activating substance determines the rate of electrical conduction. It is common to use, as this cathode activating substance, $LiCoO_2$, $LiMn_2O_4$, $LiFePO_4$ or other lithium transition-metal oxide as with liquid-based lithium-ion secondary batteries. Further, in addition to the above, new lithium transition-metal oxides have been proposed for use as a cathode activating substance. For example, Patent Document 1 proposes crystalline $LiCu_{1+x}PO_4$ as a lithium transition-metal oxide for use as a cathode activating substance. These lithium transition-metal oxides (hereinafter referred to as the above lithium transition-metal oxides) are materials low in ionic conductivity and electron conductivity.

Of the above lithium transition-metal oxides, $LiFePO_4$ is an environmentally-friendly material in that it is cheap and inexhaustible thanks to iron contained as its constituent element, thus gaining attention today. It should be noted, however, that $LiFePO_4$ has a problem in that sufficient charge and discharge characteristics cannot be achieved because of its large internal resistance. Therefore, techniques have been proposed to reduce an impedance by coating the surface of $LiFePO_4$ with carbon or lithium phosphate (refer, for example, to Non-Patent Document 2).

In a thin film lithium secondary battery, the thickness of the cathode activating substance layer is proportional to the battery capacity. In order to achieve high capacity, therefore, the cathode activating substance should be as thick as possible. In a thin film lithium secondary battery, however, increasing the thickness of the cathode activating substance layer made of a material low in ionic conductivity and electron conductivity (e.g., 10 µm or more) leads to a significantly large internal impedance.

Therefore, it is difficult to commercialize a high-capacity thin film lithium secondary battery having a thick cathode activating substance layer using any of the above lithium transition-metal oxides that are low in ionic conductivity and electron conductivity. In particular, $LiFePO_4$ has poor electrical conduction. As a result, using $LiFePO_4$ makes it impossible to increase the film thickness, thus making it difficult to commercialize a high-capacity thin film lithium secondary battery.

On the other hand, the above lithium transition-metal oxides are commonly used in a crystalline phase. Therefore, when a film of any of the above lithium transition-metal oxides is formed for a thin film lithium secondary battery, a crystalline phase is formed by heating the substrate during the film formation and post-annealing the substrate after the film formation.

PRIOR ART DOCUMENTS

Non-Patent Documents

Non-Patent Document 1: Thin-Film lithium and lithium-ion batteries, J. B. Bates et al.: Solid State Ionics, 135, 33 (2000)

Non-Patent Document 2: Journal of The Electrochemical Society, 153, E160 (2006)

Patent Document

Patent Document 1: Japanese Patent Publication No. 3965657

SUMMARY

In order to heat the substrate or post-anneal after the film formation for a thin film lithium secondary battery, however, expensive heat-resistant glass is required as a substrate, thus resulting in high manufacturing cost. Further, LiPON, LiBON and other materials used as a solid-state electrolyte in the thin film lithium secondary battery function in an amorphous state. Therefore, annealing these materials leads to degraded characteristics.

It is therefore preferred that a material that functions without being annealed should also be used as a cathode activating substance. However, if not annealed, $LiCoO_2$, $LiMn_2O_4$, $LiFePO_4$ and other lithium transition-metal oxides are highly non-crystalline, thus resulting in poor characteristics for use as a cathode activating substance. That is, if not annealed, $LiCoO_2$, $LiMn_2O_4$, $LiFePO_4$ and other lithium transition-metal oxides are lower in ionic conductivity than LiPON and other solid-state electrolytes, thus resulting in poor characteristics for use as a cathode activating substance.

In light of the above, it is an object of the present invention to provide a solid-state electrolyte battery using a cathode activating substance which functions as such in an amorphous state and has a high ionic conductivity, and to provide a cathode activating substance which has a high ionic conductivity in an amorphous state.

In order to solve the above problem, a first invention is a solid-state electrolyte battery which includes a cathode-side layer having a cathode activating substance layer, an anode-side layer and solid-state electrolyte layer formed between the cathode-side layer and anode-side layer. The cathode activating substance layer contains a lithium complex oxide in an amorphous state expressed by Formula (1).

$$Li_xM_yPO_{4-z}N_z \quad \text{Formula (1)}$$

(In the formula, M is at least one selected from among the transition metals. x is the composition ratio of lithium. y is the composition ratio of M. z is the composition ratio of nitrogen. x is $0.5 \leq x \leq 5.0$. y is $1.0 \leq y \leq 3.2$. $0.3 \leq z \leq 0.7$.)

A second invention is a cathode activating substance which is a lithium complex oxide in an amorphous state expressed by Formula (1).

$$Li_xM_yPO_{4-z}N_z \quad \text{Formula (1)}$$

(In the formula, M is at least one selected from among the transition metals. x is the composition ratio of lithium. y is the composition ratio of M. z is the composition ratio of nitrogen. x is $0.5 \leq x \leq 5.0$. y is $1.0 \leq y \leq 3.2$. $0.3 \leq z \leq 0.7$.)

A third invention is a cathode activating substance which includes lithium phosphate compound particles having an olivine crystal structure and a coating layer formed at least in part of the surfaces of the lithium phosphate compound particles. The coating layer is made of a lithium complex oxide in an amorphous state expressed by Formula (2).

$$Li_xFe_yPO_{4-z}N_z \quad \text{Formula (2)}$$

(In the formula, x is the composition ratio of lithium. y is the composition ratio of iron. z is the composition ratio of nitrogen. x is $0.5 \leq x \leq 5.0$. y is $1.0 \leq y \leq 3.2$. $0.3 \leq z \leq 0.7$.)

In the present invention, the cathode activating substance layer (or coating layer) includes a lithium complex oxide in an amorphous state expressed by Formula (1). The lithium complex oxide in an amorphous state expressed by this Formula (1) functions as a cathode activating substance having a high ionic conductivity in an amorphous state.

The present invention provides not only a solid-state electrolyte battery using a cathode activating substance which functions as such in an amorphous state and has a high ionic conductivity but also a cathode activating substance which has a high ionic conductivity in an amorphous state.

Additional features and advantages are described herein, and will be apparent from the following Detailed Description and the figures.

DETAILED DESCRIPTION

Figure 1:
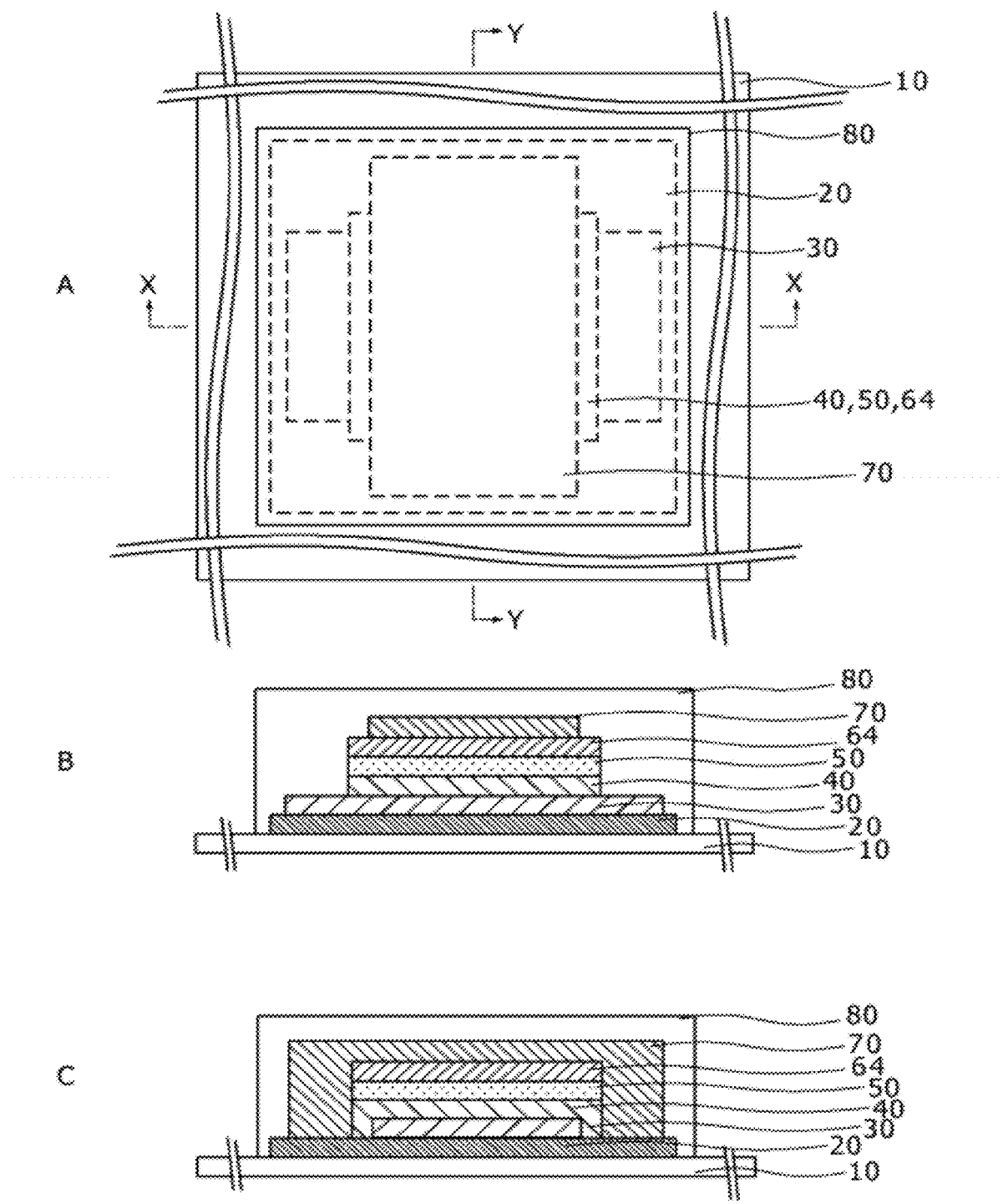
FIGS. 1A to 1C are views illustrating the configuration of a solid-state electrolyte battery according to a first embodiment of the present invention.

A description will be given below of the embodiments of the present invention with reference to the accompanying drawings. The description will be given in the following order. It should be noted that the same or like components are denoted by the same reference numerals in all the figures of the embodiments.

1. First Embodiment (first example of a solid-state electrolyte battery)
2. Second Embodiment (second example of a solid-state electrolyte battery)
3. Third Embodiment (example of a battery)
4. Other Embodiments 1. First Embodiment FIGS. 1A to 1C illustrate the configuration of a solid-state electrolyte battery according to a first embodiment of the present invention. This solid-state electrolyte battery is, for example, a chargeable and dischargeable solid-state electrolyte secondary battery. FIG. 1A is a plan view of the solid-state electrolyte battery. FIG. 1B is a cross-sectional view illustrating the cross-section along line X-X in FIG. 1A. FIG. 1C is a cross-sectional view illustrating the cross-section along line Y-Y in FIG. 1A.

As illustrated in FIGS. 1A to 1C, this solid-state electrolyte battery includes a laminated body. In the laminated body, an inorganic insulating film 20 is formed on a substrate 10, and a cathode-side current collector film 30, cathode activating substance film 40, solid-state electrolyte film 50, anode potential formation layer 64 and anode-side current collector film 70 are stacked on the inorganic insulating film 20 in this order. An overall protective film 80 made, for example, of ultraviolet hardening resin is formed in such a manner as to entirely cover the laminated body. It should be noted that the inorganic insulating film 20 may be formed on the overall protective film 80.

[Substrate]

Among different types of substrates that can be used as the substrate 10 are polycarbonate (PC) resin substrate, fluorine resin substrate, polyethylene terephthalate (PET) substrate, polybutylene terephthalate (PBT) substrate, polyimide (PI) substrate, polyamide (PA) substrate, polysulfone (PSF) substrate, polyethersulfone (PES) substrate, polyphenylene sulfide (PPS) substrate, polyetheretherketone (PEEK) substrate, polyethylene naphthalate (PEN) and cycloolefin polymers (COP). Although the material of the substrate is not specifically limited, it is more preferred that the substrate should be moisture-resistant with low moisture absorbency.
(Cathode-Side Current Collector Film 30)

Among materials that can be used to make up the cathode-side current collector film 30 are Cu, Mg, Ti, Fe, Co, Ni, Zn, Al, Ge, In, Au, Pt, Ag and Pd, and alloys containing any of the above.
(Cathode Activating Substance Film 40)

The cathode activating substance film 40 is made of a lithium complex oxide in an amorphous state expressed by Formula (1).

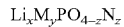 Formula (1)

(In the formula, M is one selected from among the transition metals. x is the composition ratio of lithium. y is the composition ratio of the transition metal M. z is the composition ratio of nitrogen.)

The lithium complex oxide in an amorphous state expressed by Formula (1) offers the following excellent characteristics as a cathode activating substance. That is, this oxide has a high potential versus $Li^+/Li$. The oxide has excellent potential flatness, i.e., small variation in potential resulting from composition change. The composition ratio of lithium is high, thus providing high capacity. This oxide has high electrical conductance. This oxide does not have crystalline structure collapse caused by repeated charge and discharge as do crystalline cathode activating substances, thus providing excellent charge/discharge cycle characteristics. Further, this oxide can be formed without annealing, thus simplifying the process, providing improved yield and making capable of use of a resin substrate.

Among the transition metals that can be used as the transition metal M in the lithium complex oxide expressed by Formula (1) are, more specifically, Cu, Fe, Co, Ni, Ag, Mn, Ti and V. Among others, Cu is preferred because it provides even better characteristics.

In the lithium complex oxide expressed by Formula (1), the lithium composition ratio x preferably falls within the range $0.5 \leq x \leq 5.0$. The reason for this is that a lithium composition ratio of less than 0.5 leads to reduced charge and discharge capacities. Although there is no specific upper limit for the lithium composition ratio x, the limit at which the potential can be maintained is the upper limit for the Li composition ratio x. As far as it has been confirmed, 5.0 or less is preferred.

In the lithium complex oxide expressed by Formula (1), the composition ratio y of the transition metal element M preferably falls within the range $1.0 \leq y \leq 3.2$ because this range provides sufficient charge and discharge characteristics. The M composition ratio y of less than 1.0 leads to an excessively low capacity, making the battery unfunctional as such. The M composition ratio y of 3.2 or beyond leads to loss of energy density advantage.

In the lithium complex oxide in an amorphous state expressed by Formula (1), the nitrogen composition ratio z preferably falls within the range $0.3 \leq z \leq 0.7$. The reason for this is that although, when nitrogen is introduced during sputtering, the film is formed in a nitrogen atmosphere or in a mixture gas atmosphere of argon and nitrogen, as far as investigations conducted on the prepared samples are concerned, the lithium complex oxide is probably low in ion conductivity and of no practical use if the amount of substitution for nitrogen is less than 0.3. A nitrogen composition ratio of 0.7 or more could not be obtained even when the sputtering conditions were changed. Therefore, a lithium complex oxide having such a composition does not probably exist as a stable composition.

This cathode activating substance film 40 is a completely amorphous single-phase thin film that does not contain any crystalline phase. The fact that the cathode activating substance film 40 is an amorphous single phase can be verified by observing its cross-section with a transmission electron microscope (TEM). That is, when the cross-section of this cathode activating substance film 40 is observed by the transmission electron microscope (TEM), it is possible to verify the absence of crystal grains in the TEM image. This can also be verified from an electron diffraction image.
(Solid-State Electrolyte Film 50)

Among materials that can be used to make up the solid-state electrolyte film 50 are lithium phosphate ($Li_3PO_4$), $Li_3PO_{4-x}N_x$ (generally referred to as LiPON) obtained by adding nitrogen to lithium phosphate ($Li_3PO_4$), $Li_xB_2O_{3-y}N_y$, $Li_4SiO_4$—$Li_3PO_4$ and $Li_4SiO_4$—$Li_3VO_4$.
(Anode Potential Formation Layer 64)

Among materials that can be used as the anode potential formation layer 64 are oxides containing one or more of Mn, Co, Fe, P, Ni and Si. More specifically, these oxides are, for example, $LiCoO_2$ and $LiMn_2O_4$.

In this solid-state electrolyte battery, the anode potential formation layer 64 rather than an anode activating substance film is formed during manufacture. An anode activating substance develops on the anode as the charge proceeds. What develops on the anode is a layer containing an excessive amount of Li metal or Li at the anode-side interface of the solid-state electrolyte film 50 (hereinafter referred to as the Li excess layer). The solid-state electrolyte battery offers high durability against repeated charge and discharge with no deterioration of its charge and discharge characteristics while at the same time using this Li (Li excess layer) deposited in an excessive amount as an anode activating substance.

Although letting in part of Li during initial charge of the battery, the anode potential formation layer 64 maintains the Li content at a constant value in the subsequent charge and discharge process. Moreover, thanks to this, the same layer 64 suppresses the diffusion of Li to the anode-side current collector film, thus suppressing the deterioration of the anode-side current collector film 70 for extremely excellent repeated charge and discharge characteristics and also minimizing loss of charge caused by the diffusion of Li to the anode-side current collector film 70. If it were not for the anode potential formation layer 64, Li would diffuse to the anode-side current collector film 70, thus making it impossible to maintain the total amount of Li resulting from charge and discharge of the battery at a constant value and resulting in deteriorated charge and discharge characteristics.

It should be noted that the thickness of the Li excess layer formed at the anode-side interface of the solid-state electrolyte film 50 changes with change in the thickness of the cathode activating substance film 40. However, the anode potential formation layer 64 need only function properly as a protective film against the Li excess layer formed at the anode-side interface of the solid-state electrolyte film 50. Therefore, the thickness of the anode potential formation layer 64 is not directly related to that of the Li excess layer and is independent of that of the cathode activating substance film 40.

This solid-state electrolyte battery relies on the fact that if the capacity of the anode activating substance is smaller than the amount of Li in the cathode activating substance, excess Li that cannot be accommodated in the anode activating substance precipitates at the interface so as to form a Li excess layer and serve as an anode activating substance. In this solid-state electrolyte battery, the anode potential formation layer 64 is formed sufficiently thinner than the cathode activating substance film 40 so that the anode activating substance does not substantially exist in an uncharged condition.

The anode potential formation layer 64 may be made of a material that is used as an anode activating substance. In this case, therefore, to be more precise, part of the same layer 64 serves as an anode activating substance, and the rest thereof as a protective film against the Li excess layer. If the anode potential formation layer 64 is sufficiently thinner than the cathode activating substance film 40, nearly all thereof is used as a protective film.

In this solid-state electrolyte battery, the anode potential formation layer 64 is formed sufficiently thinner than the cathode activating substance film 40 so that the Li excess layer precipitating at the interface and serving as an anode activating substance takes on more than half the task of driving the battery.

(Anode-Side Current Collector Film 70)

Among materials that can be used as the anode-side current collector film 70 are Cu, Mg, Ti, Fe, Co, Ni, Zn, Al, Ge, In, Au, Pt, Ag and Pd, and alloys containing any of the above.

(Inorganic Insulting Film 20)

The inorganic insulting film 20 need only be made of a material that allows formation of a moisture-resistant film with low moisture absorbency. Among materials that can be used to offer such characteristics are oxides, nitrides and sulfides of Si, Cr, Zr, Al, Ta, Ti, Mn, Mg and Zn and mixtures thereof.

More specifically, $Si_3N_4$, $SiO_2$, $Cr_2O_3$, $ZrO_2$, $Al_2O_3$, $TaO_2$, $TiO_2$, $Mn_2O_3$, MgO, ZnS and so on or mixtures thereof are used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

(Manufacturing Method of the Solid-State Electrolyte Battery)

The above solid-state electrolyte battery is manufactured, for example, in the following manner.

First, the inorganic insulting film 20 is formed on a substrate. Next, the cathode-side current collector film 30, cathode activating substance film 40, solid-state electrolyte film 50, anode potential formation layer 64 and anode-side current collector film 70 are formed sequentially on the inorganic insulting film 20, thus forming a laminated body. Next, the overall protective film 80 made, for example, of ultraviolet hardening resin is formed over the substrate (organic insulating substrate) 10 in such a manner as to entirely cover the laminated body and inorganic insulting film 20. The above series of steps allows formation of the solid-state electrolyte battery according to the first embodiment of the present invention.

[Thin Film Formation Method]

A description will be given below of the formation method of the inorganic insulting film 20, cathode-side current collector film 30, cathode activating substance film 40, solid-state electrolyte film 50, anode potential formation layer 64 and anode-side current collector film 70.

Each of the thin films can be formed by a gas phase method such as PVD (Physical Vapor Deposition) or CVD (Chemical Vapor Deposition). Alternatively, the thin films can be formed by a liquid phase method such as electroplating, electroless plating, coating or sol-gel method. Still alternatively, the thin films can be formed by a solid phase method such as SPE (Solid Phase Epitaxy) method or LB (Langmuir-Blodgett) method.

The PVD methods involve the evaporation of a thin film source material to be thinned by supplying energy such as heat or plasma so as to form a thin film on a substrate. Among the PVD methods are vacuum vapor deposition, sputtering, ion plating, MBE (Molecular Beam Epitaxy) and laser abrasion.

The CVD methods involve the decomposition and chemical reaction of a thin film source material supplied in the form of a gas and the formation of an intermediate product by supplying energy such as heat, light or plasma so as to deposit a thin film as a result of adsorption to, chemical reaction on and desorption from the substrate surface.

Among the CVD methods are thermal CVD, MOCVD (Metal Organic Chemical Vapor Deposition), RF plasma CVD, optical CVD, laser CVD and LPE (Liquid Phase Epitaxy).

It is easy for those skilled in the art to form the inorganic insulting film 20, cathode-side current collector film 30, cathode activating substance film 40, solid-state electrolyte film 50, anode potential formation layer 64 and anode-side current collector film 70 made of desired materials by any of the above thin film formation methods. That is, those skilled in the art can easily form the inorganic insulting film 20, cathode activating substance film 40, solid-state electrolyte film 50, anode potential formation layer 64 and anode-side current collector film 70 made of desired materials by properly selecting thin film source materials, thin film formation method, conditions for forming the thin films and other factors.

(Effect)

In the first embodiment of the present invention, the cathode activating substance film 40 is made of a lithium complex oxide in an amorphous state expressed by Formula (1). This provides a solid-state electrolyte battery having excellent characteristics.

Further, in the first embodiment of the present invention, the cathode activating substance film 40 serves as a cathode activating substance without being annealed. This eliminates the need to use expensive heat-resistant glass as the substrate 10, thus contributing to reduced manufacturing cost.

2. Second Embodiment

Figure 2:
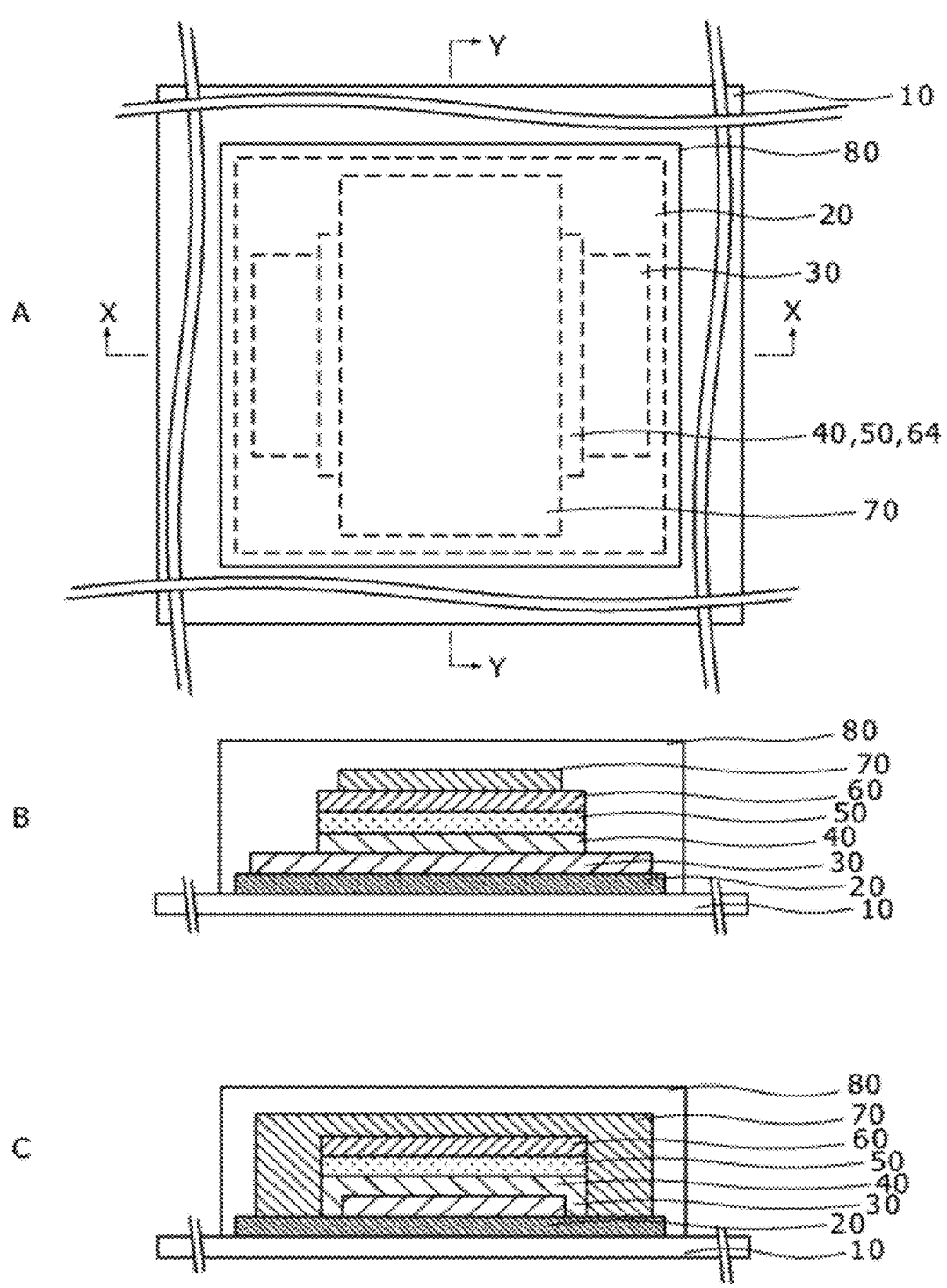
FIGS. 2A to 2C are views illustrating the configuration of the solid-state electrolyte battery according to a second embodiment of the present invention.

A description will be given below of a solid-state electrolyte battery according to a second embodiment of the present invention. This solid-state electrolyte battery is, for example, a chargeable and dischargeable solid-state electrolyte secondary battery. FIGS. 2A to 2C are views illustrating the configuration of the solid-state electrolyte battery according to a second embodiment of the present invention. FIG. 2A is a plan view of the solid-state electrolyte battery. FIG. 2B is a cross-sectional view illustrating the cross-section along line X-X in FIG. 2A. FIG. 2C is a cross-sectional view illustrating the cross-section along line Y-Y in FIG. 2A.

This solid-state electrolyte battery includes a laminated body. In the laminated body, the inorganic insulting film 20 is formed on the substrate 10, and the cathode-side current collector film 30, cathode activating substance film 40, solid-state electrolyte film 50, an anode activating substance film 60 and the anode-side current collector film 70 are stacked on the inorganic insulting film 20 in this order. The overall protective film 80 made, for example, of ultraviolet hardening resin is formed in such a manner as to entirely cover the laminated body and inorganic insulting film 20. It should be noted that the inorganic insulating film 20 may be formed on the overall protective film 80.

The substrate 10, inorganic insulting film 20, cathode activating substance film 40, solid-state electrolyte film 50, anode-side current collector film 70 and overall protective film 80 are the same as in the first embodiment. Therefore, detailed description thereof is omitted. The anode activating substance film 60 is made of the following materials.

[Anode Activating Substance Film]

The anode activating substance film 60 need only be made of a material that can easily absorb and desorb lithium ions to allow a number of lithium ions to be absorbed and desorbed by the anode activating substance film. Among materials that can be used to offer such characteristics are oxides of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V and Zn. Alternatively, a mixture of these oxides may also be used.

More specifically, the anode activating substance film 60 is made, for example, of a silicon-manganese alloy (Si—Mn), silicon-cobalt alloy (Si—Co), silicon-nickel alloy (Si—Ni), niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), indium oxide added with Sn (ITO), zinc oxide added with Al (AZO), zinc oxide added with Ga (GZO), tin oxide added with Sn (ATO) or tin oxide added with F (fluorine) (FTO). Alternatively, a mixture of these materials may also be used.

(Manufacturing Method of the Solid-State Electrolyte Battery)

The above solid-state electrolyte battery is manufactured, for example, in the following manner.

First, the inorganic insulting film 20 is formed on the substrate 10. Next, the cathode-side current collector film 30, cathode activating substance film 40, solid-state electrolyte film 50, anode activating substance film 60 and anode-side current collector film 70 are formed sequentially on the inorganic insulting film 20, thus forming a laminated body. Next, the overall protective film 80 made, for example, of ultraviolet hardening resin is formed over the substrate 10 in such a manner as to entirely cover the laminated body and inorganic insulating film 20. The above series of steps allows formation of the solid-state electrolyte battery according to the second embodiment of the present invention.

(Effect)

The second embodiment provides the same advantageous effect as the first embodiment.

3. Third Embodiment

A description will be given below of a battery according to a third embodiment of the present invention.

[Configuration of the Battery]

Figure 3:
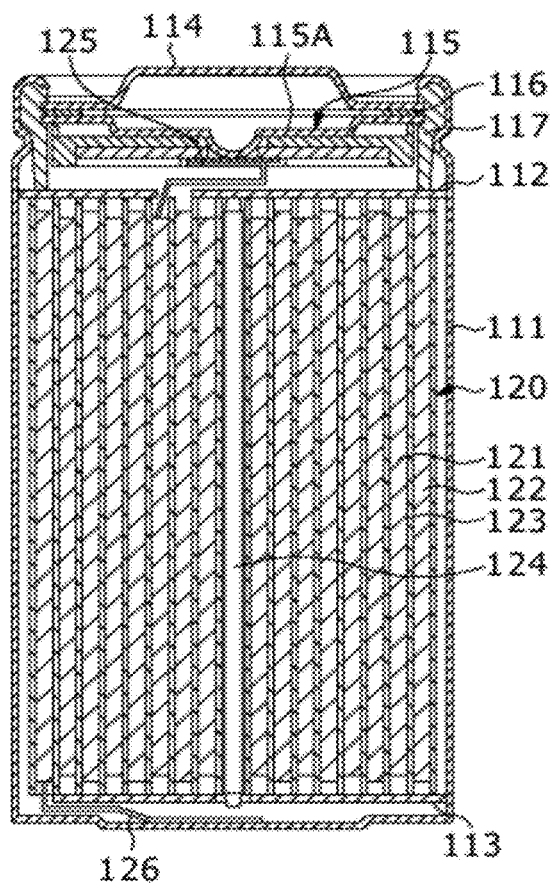
FIG. 3 is a cross-sectional view illustrating the configuration of a battery according to a third embodiment of the present invention.

FIG. 3 illustrates the cross-sectional configuration of the battery according to a third embodiment of the present invention. This battery is a non-aqueous electrolyte battery using an electrolytic solution containing an organic solvent. This battery is also a lithium ion secondary battery whose anode capacity is expressed by the capacity component based on the absorption and desorption of lithium, i.e., an electrode reactant. This battery has a battery structure called "cylindrical type."

This battery has a wound electrode body 120 and a pair of insulating plates 112 and 113. The wound electrode body 120 includes, in an almost hollow and cylindrical battery can 111, a cathode 121 and anode 122 that are wound with a separator 123 provided therebetween. The battery can 111 is made, for example, of nickel (Ni)-plated iron (Fe), with its end portions being respectively closed and open. The pair of insulating plates 112 and 113 are arranged to extend vertically relative to the circumferential surface of the wound electrode body 120 with the same body 120 sandwiched therebetween.

A battery cover 114, safety valve mechanism 115 and thermosensitive resistance element (Positive Temperature Coefficient; PTC element) 116 are attached to the open end portion of the battery can 111 by swaging with a gasket 117 provided therebetween. The safety valve mechanism 115 is provided in the battery cover 114. The battery can 111 is hermetically sealed. The battery cover 114 is made, for example, of the same material as the battery can 111. The safety valve mechanism 115 is electrically connected to the battery cover 114 via the thermosensitive resistance element 116.

This safety valve mechanism 115 is designed to cut off the electrical connection between the battery cover 114 and wound electrode body 20 by flipping a disc plate 115A if the internal pressure exceeds a given level due, for example, to internal short-circuit or external heating. The thermosensitive resistance element 116 increases its resistance with increasing temperature, thus limiting the current flow and thereby preventing abnormal heating caused by a large current flow. The gasket 117 is made, for example, of an insulating material and coated with asphalt on its surface.

The wound electrode body 120 has, for example, a center pin 124 inserted in the center thereof. In this wound electrode body 120, a cathode lead 125 made, for example, of aluminum (Al) is connected to the cathode 121, and an anode lead 126 made, for example, of nickel is connected to the anode 122. The cathode lead 125 is welded to the safety valve mechanism 115, thus ensuring its electrical connection to the battery cover 114. The anode lead 126 is welded to the battery can 111, thus ensuring its connection to the same can 111.

(Cathode)

Figure 4:
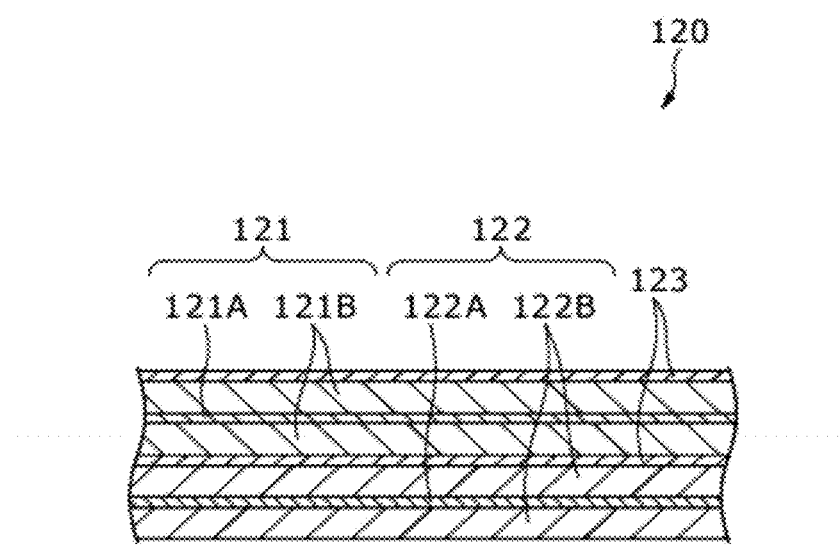
FIG. 4 is a cross-sectional view illustrating the configuration of a wound electrode body.

FIG. 4 illustrates a partially enlarged view of the wound electrode body 120 shown in FIG. 3. The cathode 121 includes, for example, a cathode activating substance layer 121B provided on each of a pair of opposed sides of a cathode current collector 121A. The cathode current collector 121A is made, for example, of a metallic material such as aluminum (Al), nickel (Ni) or stainless steel (SUS). The cathode activating substance layer 121B contains, for example, a cathode activating substance that can absorb and desorb lithium, i.e., an electrode reactant. The same layer 121B may contain a conducting agent or binding agent as necessary.

(Cathode Activating Substance)

As a cathode activating substance, a lithium phosphate compound is used which includes lithium phosphate compound particles having an olivine crystal structure and a coating layer formed at least in part of the surfaces of the lithium phosphate compound particles. The lithium phosphate compound particles having an olivine crystal structure (hereinafter referred to as the coating lithium phosphate compound) may be primary particles or secondary particles obtained as a result of the coagulation of primary particles.

(Lithium Phosphate Compound)

Among lithium phosphate compounds having an olivine crystal structure are compounds expressed by Chemical Formula I.

$$LiM_xPO_4 \qquad \text{(Chemical Formula I)}$$

(In the formula, M is at least one of a group including cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr). x is 0<x≤1.)

Among compounds expressed by Chemical Formula I are LiFePO$_4$, LiFe$_{1-y}$Me$_y$PO$_4$, LiFe$_{1-y-z}$Me1$_y$Me2$_z$PO$_4$, LiCoPO$_4$, LiCo$_{1-y}$Me$_y$PO$_4$, LiMn$_{1-y}$Me$_y$PO$_4$ (in the formula, Me, Me1 and Me2 are one selected from among cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr), and 0<y<1, and 0<z<1.)

(Coating Layer)

The coating layer is made of a lithium phosphate compound in an amorphous state expressed by Formula (2).

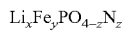

$$Li_xFe_yPO_{4-z}N_z \qquad \text{Formula (2)}$$

(In the formula, x is the composition ratio of lithium. y is the composition ratio of iron. z is the composition ratio of nitrogen. x is 0.5≤x≤5.0. y is 1.0≤y≤3.2. 0.3≤z≤0.7.)

This coating layer is a completely amorphous single-phase thin film that does not contain any crystalline phase. The fact that the coating layer is an amorphous single phase can be verified by observing its cross-section with a transmission electron microscope (TEM). That is, when the cross-section of the coating layer is observed by the transmission electron microscope (TEM), it is possible to verify the absence of crystal grains in the TEM image. This can also be verified from an electron diffraction image.

This coating layer can be formed by sputtering or vacuum vapor deposition of lithium phosphate compound particles having an olivine crystal structure. The formation of the coating layer contributes to reduced interfacial resistance of the lithium phosphate compound, thus providing a cathode activating substance that offers high ionic conductivity even on the surfaces of its particles.

(Binding Agent)

Among materials used as a binding agent are polyvinylidene difluoride (PVdF) and other fluorine-based polymer compounds.

(Conducting Agent)

Among materials used as a conducting agent are carbon materials such as graphite, carbon black and Ketjen black. These may be used alone or as a mixture of a plurality thereof. It should be noted that the conducting agent may be made of a metallic or conductive polymer material so long as it is conductive.

<Anode>

The anode 122 includes, for example, an anode activating substance layer 122B provided on each of a pair of opposed sides of an anode current collector 122A. The anode current collector 122A is made, for example, of a metallic material such as copper (Cu), nickel (Ni) or stainless steel (SUS). The anode activating substance layer 122B contains, for example, one or two or more anode materials that can absorb and desorb lithium as anode activating substances. The same layer 122B may contain a conducting agent or binding agent as necessary.

(Anode Activating Substance)

Among materials that can absorb and desorb lithium are carbon materials, metal oxides and polymer compounds.

Among carbon materials are artificial graphite such as non-graphitizable carbon, graphitizable carbon and MCMB (meso-carbon microbeads), natural graphite, pyrolytic carbons, cokes, graphites, glassy carbons, fired bodies of organic polymer compounds, carbon blacks, carbon fibers and activated carbons. Of these, cokes include, for example, pitch coke, needle coke and petroleum coke. The term "fired bodies of organic polymer compounds" refers to polymer compounds such as phenol and furan resins carbonized by firing at proper temperatures, and some thereof are classified into non-graphitizable and graphitizable carbons. Among metal oxides are iron oxide, ruthenium oxide and molybdenum oxide. On the other hand, among polymer materials are polyacetylene and polypyrrole.

Anode materials that can absorb and desorb lithium also include, for example, those materials that can absorb and desorb lithium and contain at least one metallic or metalloid element. Using such an anode material is preferred because a high energy density can be achieved. This anode material may be a metallic or metalloid element by itself, an alloy thereof or a compound thereof. Further, this anode material may partly have one, two or more phases thereof. It should be noted that, in the present invention, alloys include not only those made up of two or more metallic elements but also those containing one or more metallic elements and one or more metalloid elements. Further, alloys in the present embodiment may contain nonmetallic element. In some of these textures, a solid solution, eutectic (eutectic mixture) or intermetallic compound exists, or two or more thereof coexist.

Among metallic or metalloid elements making up this anode material are metallic or metalloid elements that can form an alloy with lithium. More specifically, among such elements are magnesium (Mg), boron (B), aluminum (Al), gallium (Ga), indium (In), silicon (Si), germanium (Ge), tin, lead (Pb), bismuth (Bi), cadmium (Cd), silver (Ag), zinc (Zn), hafnium (Hf), zirconium (Zr), yttrium (Y), palladium (Pd), and platinum (Pt). Of these, at least one of silicon (Si) and tin (Sn) is particularly preferred because these elements have outstanding capability to absorb and desorb lithium, thus providing high energy density.

Among anode materials containing at least one of silicon (Si) and tin (Sn) are silicon by itself, alloys thereof and compounds thereof, tin by itself, alloys thereof and compounds thereof, and materials partly having one, two or more phases thereof. These may be used alone or as a mixture of a plurality thereof.

Among silicon alloys are those containing, as a fourth constituent element other than silicon (Si), at least one of a group including tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Among tin alloys are those containing, as a fourth constituent element other than tin (Sn), at least one of a group including silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Among tin or silicon compounds are those containing oxygen (O) or carbon (C), and these compounds may contain the above fourth constituent element in addition to tin (Sn) or silicon (Si).

An anode materials containing, for example, tin (Sn) as a first constituent element and fourth and third constituent elements in addition to tin (Sn) is particularly preferred as an anode material containing at least one of silicon (Si) and tin (Sn). Naturally, these anode materials may be used together with the above anode materials. The fourth constituent element is at least one of a group including cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi) and silicon (Si).

The third constituent element is at least one of a group including boron (B), carbon (C), aluminum (Al) and phosphorus (P). the reason for this is that containing the fourth and third elements provides improved cycle characteristics.

Among others, CoSnC-containing materials containing, as constituent elements, tin (Sn), cobalt (Co) and carbon (C), are preferred whose carbon (C) content falls within the range from 9.9 mass % to 29.7 mass % and in which the ratio of cobalt (Co) (Co/(Sn+Co)) to the sum of tin (Sn) and cobalt (Co) falls within the range from 30 mass % to 70 mass %. The reason for this is that a high energy density and excellent cycle characteristics can be achieved when the composition falls within the above ranges.

These CoSnC-containing materials may further contain other constituent elements as necessary. Among other preferred constituent elements are silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) and bismuth (Bi), and two or more of these elements may be contained. The reason for this is that improved capacity and cycle characteristics can be achieved.

It should be noted that it is preferred that CoSnC-containing materials should have a phase containing tin (Sn), cobalt (Co) and carbon (C), and that this phase should have a low crystalline or amorphous structure. Further, it is preferred that at least part of carbon, i.e., one of the constituent elements, is bonded to a metallic element, i.e., other constituent element, or a metalloid element in CoSnC-containing materials. The reason for this is that the reduction in cycle characteristic is probably caused by the aggregation or crystallization of tin (Sn) and other elements, and that the bonding of carbon to other element suppresses such aggregation or crystallization.

X-ray photoelectron spectroscopy (XPS) is used, for example, as a measurement method to investigate the bonding of elements. With XPS, if graphite is tested in an apparatus that is energy-calibrated so that the peak of the 4f orbital of gold atom (Au4f) is obtained at 84.0 eV, the peak of the 1s orbital of carbon (C1s) appears at 284.5 eV. Further, that of surface contamination carbon appears at 284.8 eV. In contrast, if the charge density of carbon element is high as when carbon is bonded to a metallic element or metalloid element, the peak of the C1s appears in a range lower than 284.5 eV. That is, if the peak of the composite wave of the C1s obtained for a CoSnC-containing material appears in a range lower than 284.5 eV, at least part of carbon (C) contained in the CoSnC-containing material is bonded to a metallic element, i.e., other constituent element, or a metalloid element.

It should be noted that the spectrum energy axis is corrected using the C1s peak in XPS. Because there is normally surface contamination carbon on the surface, the C1s peak of the surface contamination carbon is set at 284.8 eV and used as an energy reference. In XPS, a C1s peak waveform is obtained in a form containing the peak of the surface contamination carbon and that of carbon contained in the CoSnC-containing material. Therefore, the peak of the surface contamination carbon and that of carbon contained in the CoSnC-containing material are separated by analysis using, for example, commercially available software. In order to analyze the waveform, the position of the main peak existing on the binding energy side is set at the energy reference (284.8 eV).

(Conducting Agent)

Among materials used as a conducting agent are carbon materials such as graphite and carbon black. These may be used alone or as a mixture of a plurality thereof. It should be noted that the conducting agent may be made of a metallic or conductive polymer material so long as it is conductive.

(Binding Agent)

Among materials used as a binding agent are styrene-butadiene-based rubbers, fluorine-based rubbers, synthetic rubbers such as ethylene-propylene-diene and polymer materials such as polyvinylidene difluoride. These may be used alone or as a mixture of a plurality thereof.

[Electrolytic Solution]

Electrolytic solution contains a solvent and electrolyte salt. Among solvents are carbonate ester-based solvents such as ethylene carbonate, propylene carbonate, vinylene carbonate, dimethyl carbonate, ethyl methyl carbonate and diethyl carbonate, ether-based solvents such as 1,2-dimethoxyethane, 1-ethoxy-2-methoxyethane, 1,2-diethoxyethane, tetrahydrofuran and 2-methyltetrahydrofuran, lactone-based solvents such as γ-butyrolactone, γ-valerolactone, δ-valerolactone and ε-caprolactone, nitrile-based solvents such as acetonitrile, non-aqueous solvents such as sulfolane-based solvents, phosphoric acids, phosphate ester solvents and pyrrolidones. One of the above solvents may be used alone, or two or more thereof may be used as a mixture.

As an electrolyte salt, lithium salts such as $LiPF_6$, $LiClO_4$, $LiBF_4$, $LiN(CF_3SO_2)_2$, $LiN(C_2F_5SO_2)_2$ and $LiAsF_6$ can be used. One of the above lithium salts may be used alone, or two or more thereof may be used as a mixture.

(Separator)

The separator 123 separates the cathode 121 and anode 122, thus permitting the passage of lithium ions while at the same time preventing short-circuiting of electric current caused by contact of the two electrodes. This separator 35 is made, for example, of a porous film which is made of a synthetic resin such as polytetrafluoroethylene, polypropylene or polyethylene, or a porous film which is made of a ceramic. The separator 123 may have a layered structure made up of two or more different porous films.

[Manufacturing Method of the Battery]

The above battery is manufactured, for example, in the following manner.

First, the cathode activating substance layer 121B is formed, for example, on each of the two sides of the cathode current collector 121A, thus fabricating the cathode 121. In order to form the cathode activating substance layers 121B, a cathode mix which is a mixture of cathode activating substance powder, conducting agent and binding agent is dispersed in a solvent such as N-methyl-2-pyrrolidone, thus producing a cathode mix slurry in a paste form. Then, the cathode mix slurry is applied to the cathode current collector 121A and allowed to dry, after which the slurry is compression-molded.

Further, the cathode activating substance layer 122B is formed on each of the two sides of the cathode current collector 122A, for example, by following the same procedure as for the cathode 121, thus fabricating the anode 122.

Next, the cathode lead 125 is attached to the cathode current collector 121A by welding, and the anode lead 126 is attached to the cathode current collector 122A by welding.

Next, the cathode 121 and anode 122 are wound with the separator 123 provided therebetween, thus forming the wound electrode body 120. Then, the tip portion of the cathode lead 125 is welded to the safety valve mechanism 115, and the tip portion of the anode lead 126 to the battery can 111, after which the wound electrode body 120 is put into the battery can 111 while being sandwiched between the pair of insulating plates 112 and 113.

Next, the above electrolytic solution is poured into the battery can 111, thus allowing the solution to impregnate the separator 123. Finally, the battery cover 114, safety valve mechanism 115 and thermosensitive resistance element 116 are fastened to the opening edge portion of the battery can 111 by swaging, with the gasket 117 provided therebetween. This provides the battery shown in FIGS. 3 and 4.

<Effect>

The battery according to the third embodiment of the present invention uses, as a cathode activating substance, a lithium phosphate compound that includes lithium phosphate compound particles having an olivine crystal structure and a coating layer formed at least in part of the surfaces of the lithium phosphate compound particles. This provides improved battery characteristics including output characteristics.

Application Example

While a detailed description will be given below of the present invention by way of an application example, the present invention is not limited to this application example.

<Sample 1-1>

A solid-state electrolyte battery whose configuration is shown in FIG. 1 was fabricated. A 1.1 mm thick polycarbonate (PC) substrate was used as the substrate 10. An SCZ ($SiO_2$—$Cr_2O_3$—$ZrO_2$) was formed as the inorganic insulating film 20 on the entire surface of the substrate 10.

A metallic mask was placed on the inorganic insulating film 20, and then the cathode-side current collector film 30, cathode activating substance film 40, solid-state electrolyte film 50, anode potential formation layer 64 and anode-side current collector film 70 were formed in this order in a given region, thus forming a laminated body. A Ti film was formed as the cathode-side current collector film 30, a $Li_xCu_yPO_{4-z}N_z$ film as the cathode activating substance film 40, a $Li_3PO_4N_x$ film as the solid-state electrolyte film 50, a $LiCoO_2$ film as the anode potential formation layer 64, and a Ti film as the anode-side current collector film 70. The conditions for forming the inorganic insulating film 20 and each of the thin films making up the laminated body were as described below. It should be noted that the substrate 10 was not heated, and that the substrate holder was cooled instead by water at 20° C. for film formation.

[Inorganic Insulating Film 20]

The inorganic insulating film 20 was formed by the following sputtering apparatus under the following conditions:
Sputtering apparatus (C-3103 by ANELVA)
Target composition: SCZ ($SiO_2$ 35 at % (atomic percent)+$Cr_2O_3$ 30 at %+$ZrO_2$ 35 at %)
Target size: Φ6 inches
Sputtering gas: Ar 100 sccm, 0.13 Pa
Sputtering power: 1000 W (RF)
Film thickness: 50 nm

[Cathode-Side Current Collector Film 30]

The cathode-side current collector film 30 was formed by the following sputtering apparatus under the following conditions:
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 100 nm

[Cathode Activating Substance Film 40]

The cathode activating substance film 40 was formed by the following sputtering apparatus under the following conditions:
Sputtering apparatus (SMO-01 special model by ULVAC, Inc.)
Target composition: Cosputtering of $Li_3PO_4$ and Cu
Target size: Φ4 inches
Sputtering gas: Ar 20 sccm+$N_2$ 20 sccm, 0.26 Pa
Sputtering power: 600 W for $Li_3PO_4$ and 50 W for Cu (DC)
Film thickness: 400 nm

[Solid-State Electrolyte Film 50]

The solid-state electrolyte film 50 was formed by the following sputtering apparatus under the following conditions:
Sputtering apparatus (SMO-01 special model by ULVAC, Inc.)
Target composition: $Li_3PO_4$
Target size: Φ4 inches
Sputtering gas: Ar 20 sccm+$N_2$ 20 sccm, 0.26 Pa
Sputtering power: 600 W (RF)
Film thickness: 400 nm

[Anode Potential Formation Layer 64]

The anode potential formation layer 64 was formed by the following sputtering apparatus under the following conditions:
Sputtering apparatus (SMO-01 special model by ULVAC, Inc.)
Target composition: $LiCoO_2$
Target size: Φ4 inches
Sputtering gas: (mixture gas of Ar 80% and $O_2$ 20%), 20 sccm, 0.20 Pa
Sputtering power: 300 W (RF)
Film thickness: 10 nm

[Anode-Side Current Collector Film 70]

The anode-side current collector film 70 was formed by the following sputtering apparatus under the following conditions:
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 200 nm Next, the overall protective film 80 was formed using ultraviolet-hardening resin (by Sony Chemicals & Information Device Corporation, model No. SK3200), and further, the inorganic insulating film 20 was formed on the overall protective film 40. As a result, the solid-state electrolyte battery of Sample 1-1 was obtained. That is, the solid-state electrolyte battery of Sample 1-1 made of the following films was obtained.

Film configuration of the solid-state electrolyte battery:
Polycarbonate substrate/SCZ (50 nm)/Ti (100 nm)/$Li_xCu_yPO_{4-z}N_z$ (400 nm)/Li $PO_4N_x$ (400 nm)/$LiCoO_2$ (10 nm)/Ti (200 nm)/ultraviolet-hardening resin (20 μm)/SCZ (50 nm)

[Analysis of the Cathode Activating Substance Film 40]
(XPS Analysis)

Figure 5:
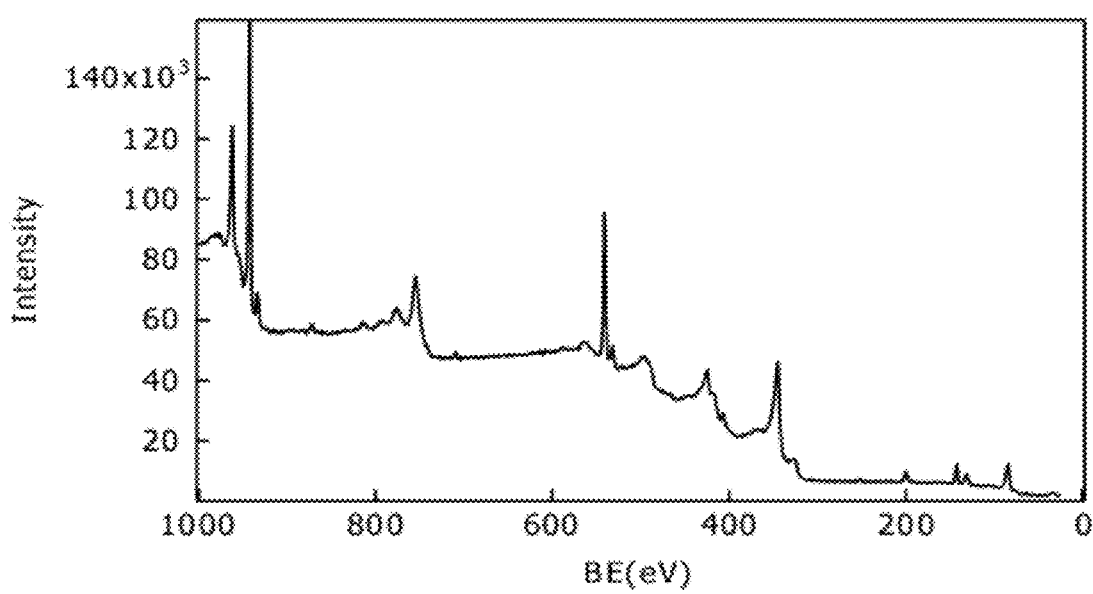
FIG. 5 is an XPS spectrum of a cathode activating substance film.

The cathode activating substance film 40 was analyzed in the following manner. A single-layer film similar to the cathode activating substance film 40 was formed on a piece of quartz glass under the same film formation conditions as for the cathode activating substance film 40, and the composition of the above film was analyzed by X-ray photoelectron spectroscopy (XPS). The measurement result is shown in FIG. 5. It was found from the measurement result that the single-layer film was composed of $Li_{2.0}Cu_{1.6}Po_{3.2}N_{0.7}$.

(TEM Analysis)

Figure 6:
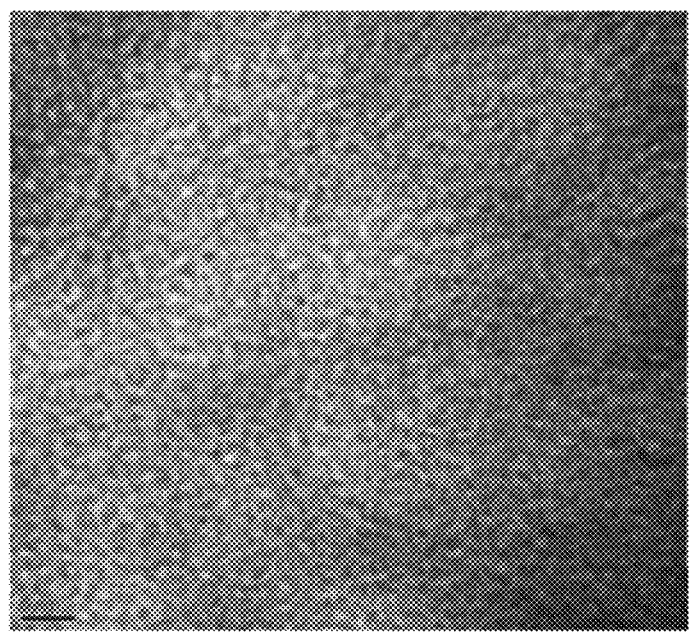
FIGS. 6A and 6B are TEM image and electron diffraction image of the cross-section of the cathode activating substance film.
Figure 6:
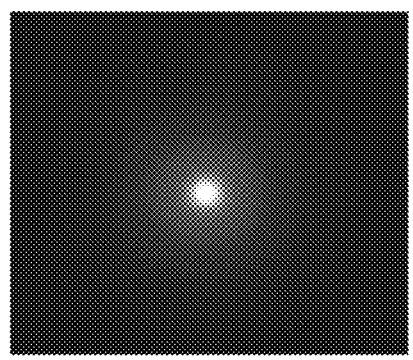

Further, the cross-section of this single-layer film was observed with a transmission electron microscope (TEM). The measurement result is shown in FIGS. 6A and 6B. FIG. 6A illustrates a TEM image observed by a transmission electron microscope (TEM), and FIG. 6B an electron diffraction image.

As illustrated in FIG. 6A, crystal grains were not observed in the TEM image, and as illustrated in FIG. 6B, a halo ring indicating amorphousness was observed in the electron diffraction image. As a result, it was verified that the cathode activating substance film 40 was amorphous.

(X-Ray Reflection Measurement)

The above single-layer film similar to the cathode activating substance film 40 was measured by X-ray reflection measurement. As a result, the density of the single-layer film was found to be about 3.3 g/cc.

(Charge/Discharge Test)

Figure 7:
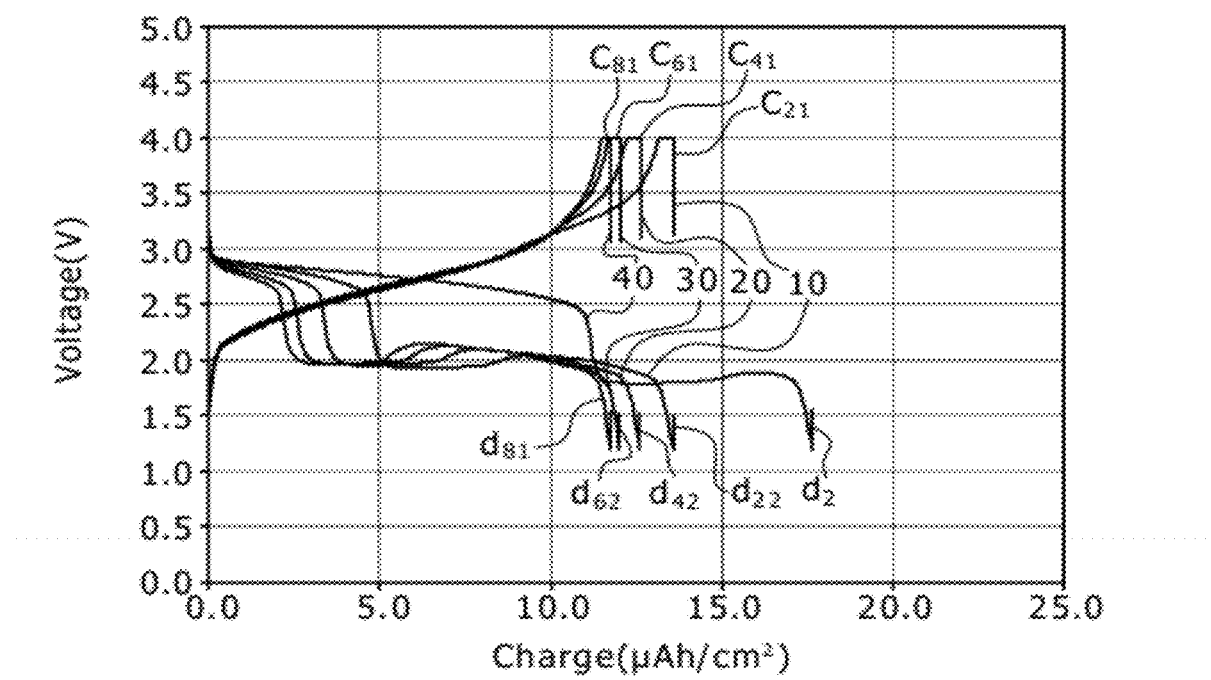
FIG. 7 is a graph illustrating charge and discharge curves.

The solid-state electrolyte battery of Sample 1-1 was subjected to a charge/discharge test. The charge was conducted at a charge current of 16 μA and a charge cutoff voltage of 4 V, and the discharge at a discharge current of 16 μA and a discharge cutoff voltage of 1.2 V. It should be noted that 16 μA is equivalent to 1 C (current at which the theoretical capacity is charged or discharged in an hour). FIG. 7 illustrates the measurement result. It should be noted that line $c_x$ in FIG. 7 shows a charge curve. The subscript x is an odd number, showing that the line $c_x$ is a charge curve for the ((x+1)/2)th (cycle) charge. Line $d_y$ shows a discharge curve. The subscript y is an even number, showing that the line $d_y$ is a discharge curve for the (y/2)th discharge after the initial charge. On the other hand, the numbers added to the charge and discharge curves are cycle counts (the same holds true for the figures described below).

Figure 8:
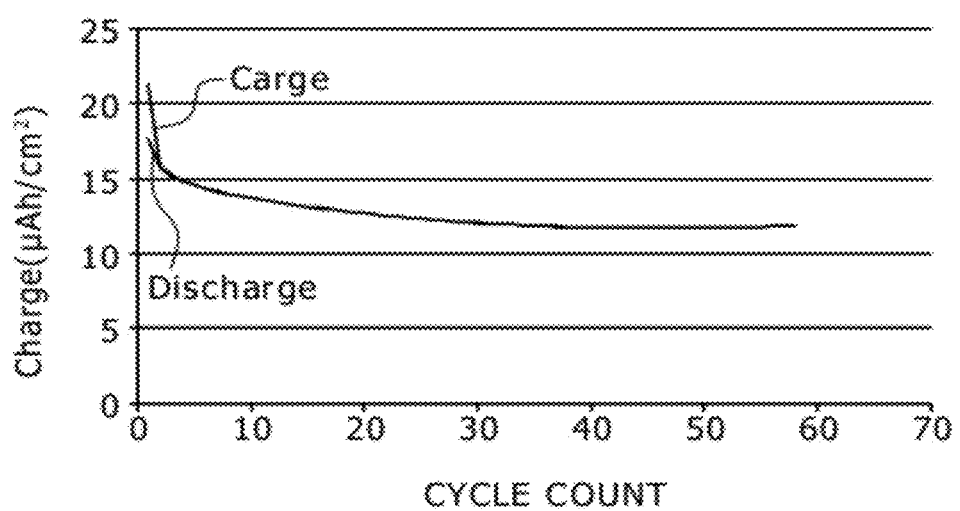
FIG. 8 is a graph plotting charge and discharge capacities versus cycle count.

Further, FIG. 8 illustrates a graph plotting charge and discharge capacities versus cycle count.

As illustrated in FIG. 7, three-stepped potentials appear which are a distinctive feature of discharge curves. As illustrated in FIG. 8, on the other hand, the charge and discharge capacities decline until the cycle count is less than 30 after the initial charge and discharge. From the 30th cycle onward, however, the charge and discharge capacities are stable with no decline later. It is clear therefrom that the battery is extremely durable.

[Study on the Composition Ratio x of Lithium]

The initial discharge capacity was about 17 μAh/cm². The following calculations were made from this discharge capacity (17 μAh/cm²), the measured density (3.3 g/cc) of the cathode activating substance film 40 obtained from X-ray reflection measurement and the composition ($Li_2Cu_{1.6}PO_{3.2}N_{0.7}$) of the cathode activating substance film 40 before the charge to find the composition ratio x of lithium at full charge. As a result, the composition of the cathode activating substance film 40 was found to be $Li_{1.0}Cu_{1.6}PO_{3.2}N_{0.7}$.

(Calculations of the Composition Ratio of Lithium at Full Charge)

From the fact that the specific capacity (mAh/g)×film density (3.3 g/cc)×film thickness cm=charge capacity of 17 μAh/cm² (measured value), a specific capacity of 130 (mAh/g) was found. From the density of each atom (g/mol), on the other hand, the density of $Li_{2.0}Cu_{1.6}PO_{3.2}N_{0.7}$ was found to be 207 g/mol. From the Faraday constant ($9.6 \times 10^4$ C/mol), the amount of electric charge was found to be 129 mAh/g when the composition ratio x of Li was changed from 2 to 1. As for the specific capacity of 130 (mAh/g) found above, it is appropriate, in consideration of experimental error, to think that the battery capacity is valid when x is equal to 1 or above.

It is clear from the above that the range of lithium composition ratio for charge and discharge of the solid-state electrolyte battery of Sample 1-1 is $1.0 \leq x \leq 2.0$. That is, as the charge proceeds, the lithium composition ratio x declines from x=2 at the time of film formation. When the lithium composition ratio x declines near x=1.0, the impedance increases, thus increasing the charge voltage and completing the charge.

It is clear from this that if the lithium composition ratio x in $Li_xCu_yPO_{4-z}N_z$ making up the cathode activating substance film 40 after the formation of the same film 40 (before the charge) is smaller than 1.0, the impedance is too large for the charge to proceed, thus making the battery unfunctional as such. It is, therefore, clear that the lithium composition ratio x in $Li_xCu_yPO_{4-z}N_z$ making up the cathode activating substance film 40 should preferably be 1.0 or greater.

<Sample 1-2>

As Sample 1-2, a solid-state electrolyte film with a higher nitrogen composition ratio z in $Li_xCu_yPO_{4-z}N_z$ making up the cathode activating substance film 40 was fabricated. That is, the solid-state electrolyte battery of Sample 1-2 was fabricated in the same manner as that of Sample 1-1 except that the cathode activating substance film 40 was formed under the conditions given below.

[Cathode Activating Substance Film 40]

The cathode activating substance film 40 was formed on the cathode-side current collector film 30 under the following conditions:

Sputtering apparatus (SMO-01 special model by ULVAC, Inc.)
Target composition: Cosputtering of $Li_3PO_4$ and Cu
Target size: Φ4 inches
Sputtering gas: Ar 20 sccm+$N_2$ 20 sccm, 0.65 Pa
Sputtering power: 600 W for $Li_3PO_4$ (RF) and 70 W for Cu (DC)
Film thickness: 280 nm (Analysis of the Cathode Activating Substance Film 40)

The composition of the cathode activating substance film 40 was analyzed by X-ray photoelectron spectroscopy (XPS) in the same manner as for Sample 1-1. The composition of the single-layer film similar to the cathode activating substance film 40 was $Li_{4.0}Cu_{1.0}PO_{3.6}N_{0.4}$. On the other hand, no crystal grains were found in the TEM image when this single-layer film was observed with a transmission electron microscope (TEM). Instead, a halo ring indicating amorphousness was observed in the electron diffraction image. As a result, it was verified that the cathode activating substance film 40 was amorphous.

(Charge/Discharge Test)

Figure 9:
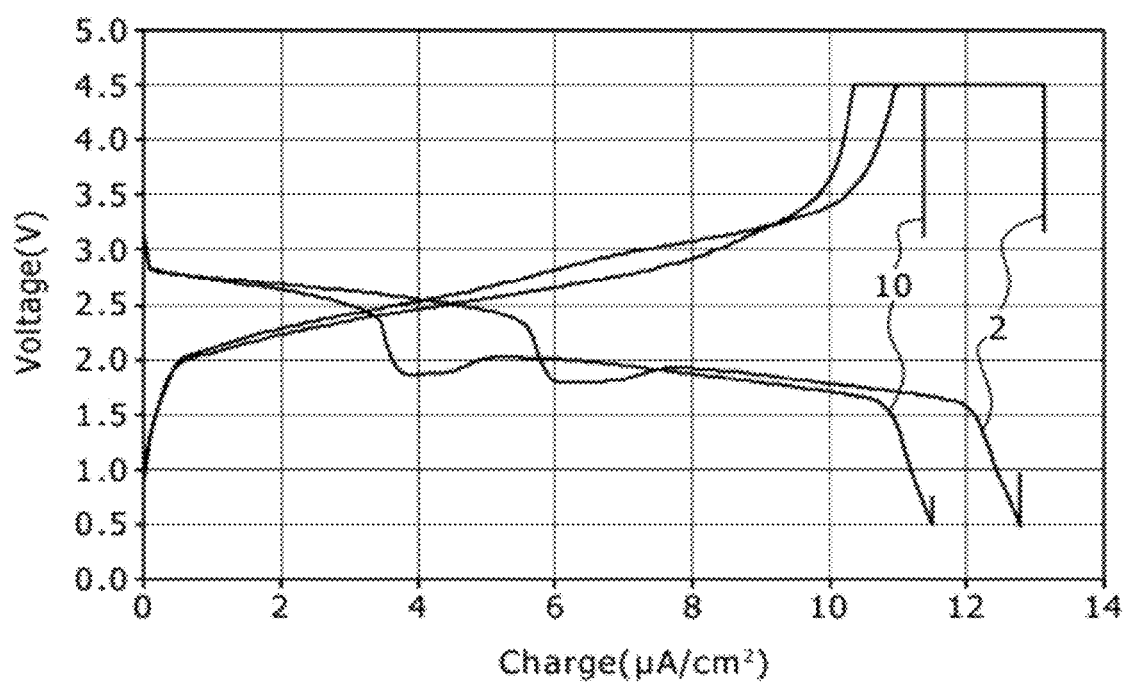
FIG. 9 is a graph illustrating charge and discharge curves.

The solid-state electrolyte battery of Sample 1-2 was subjected to a charge/discharge test. The charge was conducted at a charge current of 30 μA and a charge cutoff voltage of 4.5 V, and the discharge at a discharge current of 30 μA and a discharge cutoff voltage of 0.5 V. It should be noted that 30 μA is equivalent to 2 C (current at which the theoretical capacity is charged or discharged in half an hour). FIG. 9 illustrates the measurement result.

As illustrated in FIG. 9, three-stepped potentials appear which are a distinctive feature of discharge curves. The discharge voltage at the third step is highly flat at 2.0 V, thus making it obvious that excellent characteristics have been achieved.

(Large-Current Discharge)

Figure 10:
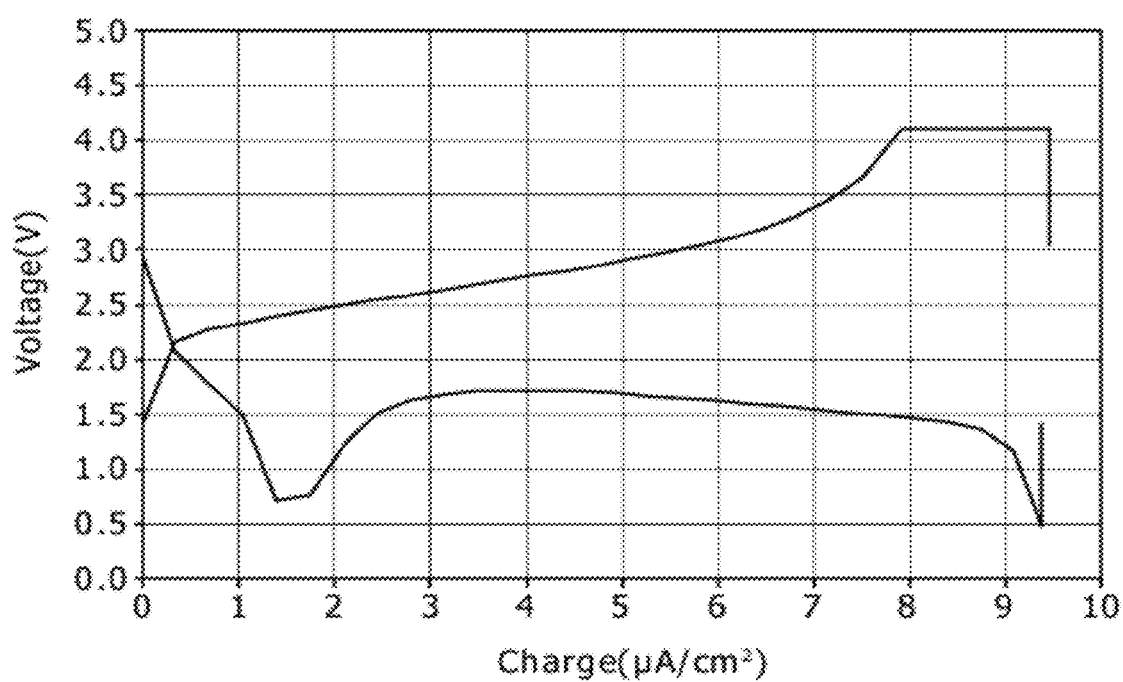
FIG. 10 is a graph illustrating charge and discharge curves.

Further, the battery went through a cycle of charge and discharge after a repetition of 68 times of charge and discharge. This charge was conducted at a charge current of 600 μA and a charge cutoff voltage of 4.2 V, and the discharge at a discharge current of 600 μA and a discharge cutoff voltage of 0.5 V. It should be noted that 600 μA is equivalent to 40 C (current at which the theoretical capacity is charged or discharged in 0.025 of an hour). FIG. 10 illustrates the measurement result.

As illustrated in FIG. 10, the potential of the second step declines as with Sample 1-1. However, the potential of the third step is maintained constant thanks to a low impedance of the (cathode activating substance film). Even during a high-speed discharge (large-current discharge) like this, the potential of the third step is maintained at 1.5 V.

(Impedance Measurement)

Figure 11:
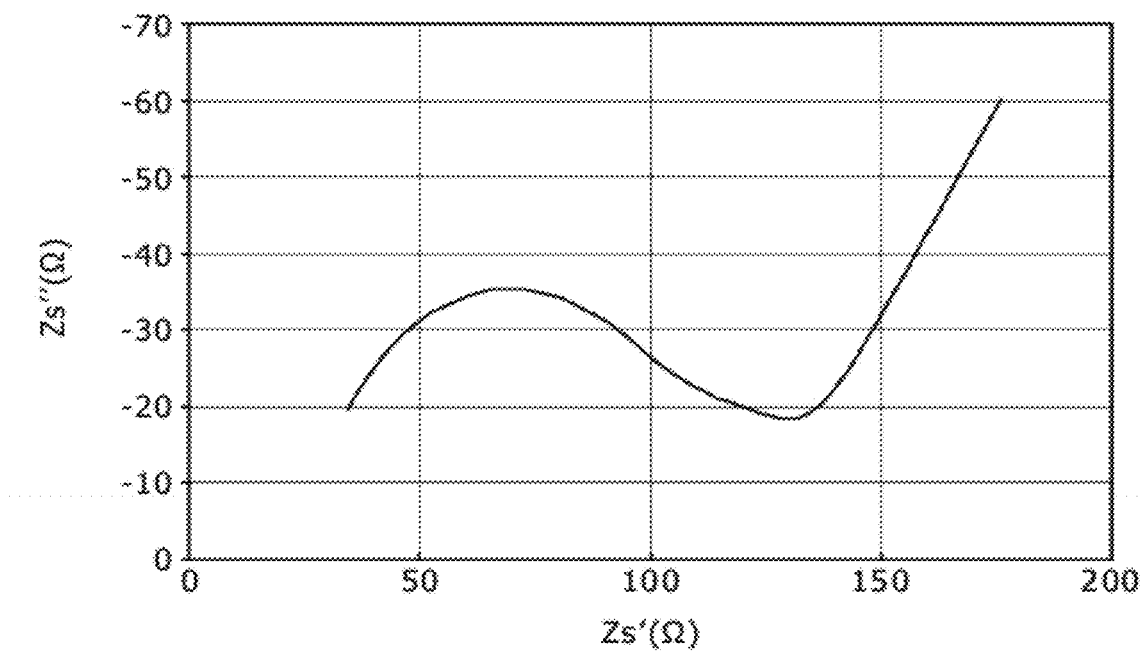
FIG. 11 is a Nyquist plot.

The impedance was measured in a fully discharged condition after the charge/discharge test. The ZM2354 manufactured by NF was used as a measuring instrument with the measurement frequency set to range from 40 Hz to 200 kHz. FIG. 11 illustrates the measurement result in the form of a Niquist plot. In FIG. 11, the horizontal axis is the real component $Zs'$ of the impedance, and the vertical axis is the imaginary component $Zs''$ of the impedance.

It is known from other experiments that the impedance near $Zs'=70\Omega$ is that of the LIPON layer (solid-state electrolyte film 50), and the conductance of this layer is $6.7 \times 10^{-7}$ S/cm. The impedance component of $110\Omega$ to $130\Omega$ is the impedance of the $Li_xCu_yPO_{4-z}N_z$ layer. Although it is impossible to calculate an accurate figure because the impedance of the $Li_xCu_yPO_{4-z}N_z$ layer overlaps that of the LiPON layer (solid-state electrolyte film 50), it is clear that the impedance of the $Li_xCu_yPO_{4-z}N_z$ layer is more or less the same as that of the LiPON layer, or of the order of $10^{-6}$ S/cm. It is clear that this conductance is far more outstanding than those of $LiCoO_2$ and $LiMn_2O_4$, i.e., ordinary cathode activating substances, ranging from $1 \times 10^{-7}$ S/cm to $1 \times 10^{-8}$ S/cm.

<Sample 1-3>

A solid-state electrolyte battery with a higher copper composition ratio y in $Li_xCu_yPO_{4-z}N_z$ making up the cathode activating substance film 40 was fabricated. That is, the solid-state electrolyte battery of Sample 1-3 was fabricated in the same manner as that of Sample 1-1 except that the cathode activating substance film 40 was formed under the conditions given below.

[Cathode Activating Substance Film 40]

The cathode activating substance film 40 was formed on the cathode-side current collector film 30 under the following conditions:
Sputtering apparatus (SMO-01 special model by ULVAC, Inc.)
Target composition: Cosputtering of $Li_3PO_4$ and Cu
Target size: Φ4 inches
Sputtering gas: Ar 20 sccm+$N_2$ 40 sccm, 0.36 Pa
Sputtering power: 600 W for $Li_3PO_4$ (RF) and 100 W for Cu (DC)
Film thickness: 510 nm (Analysis of the Cathode Activating Substance Film 40)

The composition of the cathode activating substance film 40 was analyzed by X-ray photoelectron spectroscopy (XPS) in the same manner as for Sample 1-1. The composition of the single-layer film similar to the cathode activating substance film 40 was $Li_{2.0}Cu_{3.2}PO_{3.5}N_{0.5}$. On the other hand, no crystal grains were found in the TEM image when this single-layer film was observed with a transmission electron microscope (TEM). Instead, a halo ring indicating amorphousness was observed in the electron diffraction image. As a result, it was verified that the cathode activating substance film 40 was amorphous.

(Charge/Discharge Test)

Figure 12:
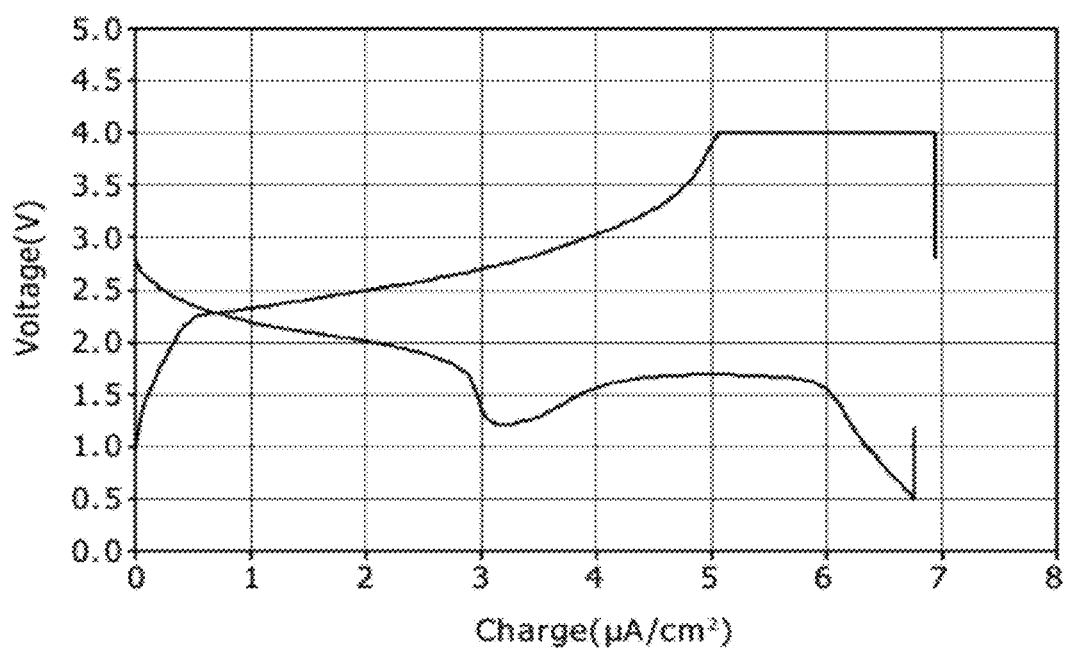
FIG. 12 is a graph illustrating charge and discharge curves.

The solid-state electrolyte battery of Sample 1-3 was subjected to a charge/discharge test. The charge was conducted at a charge current of 30 μA and a charge cutoff voltage of 4.5 V, and the discharge at a discharge current of 30 μA and a discharge cutoff voltage of 0.5 V. It should be noted that 30 μA is equivalent to 2 C (current at which the theoretical capacity is charged or discharged in half an hour). FIG. 12 illustrates the measurement result.

As illustrated in FIG. 12, the discharge curve has a high-impedance area appearing on the second step, with the third step being an area where the battery can be charged or discharged at high speed as with Sample 1-2. It is clear from this that even if the composition of the cathode activating substance film 40 is $Li_{2.0}CH_{3.2}PO_{3.5}N_{0.5}$, the battery is functional with excellent characteristics.

On the other hand, the charge and discharge capacities of Sample 1-3 are about one half those of Sample 1-2 despite the fact that the film thickness of Sample 1-3 is greater than that of Sample 1-2, compared to Sample 1-2. That is, if the cathode activating substance film 40 is made of $Li_{2.0}Cu_{3.2}PO_{3.5}N_{0.5}$, i.e., a film whose copper composition ratio is greater than in Sample 1-2, it is clear that the energy density declines. It is moreover clear that if the copper composition ratio is increased more than 3.2, the energy density tends to decline further. It is clear from this that the copper composition ratio y in $Li_xCu_yPO_{4-z}N_z$ making up the cathode activating substance film 40 should preferably be 3.2 or less in order to achieve the energy density advantage.

<Sample 1-4>

The solid-state electrolyte battery of Sample 1-4 was fabricated in the same manner as that of Sample 1-1 except that the cathode activating substance film 40 was formed under the conditions given below.

[Cathode Activating Substance Film 40]

The cathode activating substance film 40 was formed on the cathode-side current collector film 30 under the following conditions:
Sputtering apparatus (SMO-01 special model by ULVAC, Inc.)
Target composition: Cosputtering of $Li_3PO_4$ and Cu
Target size: Φ4 inches
Sputtering gas: Ar 20 sccm+$N_2$ 100 sccm, 0.65 Pa
Sputtering power: 600 W for $Li_3PO_4$ (RF) and 100 W for Cu (DC)
Film thickness: 450 nm (Analysis of the Cathode Activating Substance Film 40)

The composition of the cathode activating substance film 40 was analyzed by X-ray photoelectron spectroscopy (XPS) in the same manner as for Sample 1-1. The composition of the single-layer film similar to the cathode activating substance film 40 was $Li_{5.0}Cu_{2.8}PO_{3.1}N_{0.4}$. On the other hand, no crystal grains were found in the TEM image when this single-layer film was observed with a transmission electron microscope (TEM). Instead, a halo ring indicating amorphousness was observed in the electron diffraction image. As a result, it was verified that the cathode activating substance film 40 was amorphous.

(Charge/Discharge Test)

The solid-state electrolyte battery of Sample 1-4 was subjected to a charge/discharge test. The charge was conducted at a charge current of 30 μA and a charge cutoff voltage of 4.5 V, and the discharge at a discharge current of 30 μA and a discharge cutoff voltage of 0.5 V. It should be noted that 30 μA is equivalent to 2 C (current at which the theoretical capacity is charged or discharged in half an hour).

The discharge capacity of Sample 1-4 is 8 μAh/cm² which is small as is that of Sample 1-2. The reason for this is that the copper composition ratio y in $Li_xCu_yPO_{4-z}N_z$ making up the cathode activating substance film 40 is 2.8 which is high. On the other hand, the lithium composition ratio x at the time of film formation is 5.0. With this cathode activating substance film 40, the potential is maintained constant even when the lithium composition ratio x is 5.0.

As described above, the cathode activating substance film 40 provides a high potential versus $Li^+/Li$ even when the lithium composition ratio x is 5.0. It is safe to say that this cathode activating substance film 40 provides excellent characteristics when the composition ratio x in $Li_xCu_yPO_{4-z}N_z$ is 5 or less. That is, it is clear that $Li_xCu_yPO_{4-z}N_z$ in an amorphous state provides a high potential versus $Li^+/Li$ even when the lithium composition ratio x is high.

It should be noted that the lithium composition ratio x is about 4 based on the calculations from the discharge capacity, the film composition at the time of film formation and the film density, when the cathode activating substance film 40 is fully charged. It is clear from this that Sample 1-4 is charged and discharged with the lithium composition ratio x in $Li_xCu_yPO_{4-z}N_z$ falling within the range from 4 to 5, and this ratio is probably dependent on the film formation and charge and discharge conditions. The findings to be emphasized are that $Li_xCu_yPO_{4-z}N_z$ in an amorphous state provides a high potential versus $Li^+/Li$ even when the lithium composition ratio x is high.

<Sample 1-5>

The solid-state electrolyte battery of Sample 1-5 was fabricated in the same manner as that of Sample 1-1 except that the cathode activating substance film 40 was formed under the conditions given below.

[Cathode Activating Substance Film 40]

The cathode activating substance film 40 was formed on the cathode-side current collector film 30 under the following conditions:

Sputtering apparatus (SMO-01 special model by ULVAC, Inc.)

Target composition: Cosputtering of $Li_3PO_4$ and Cu

Target size: Φ4 inches

Sputtering gas: Ar 20 sccm+$N_2$ 100 sccm, 0.65 Pa

Sputtering power: 600 W for $Li_3PO_4$ (RF) and 25 W for Cu (DC)

Film thickness: 268 nm (Analysis of the Cathode Activating Substance Film 40)

The composition of the cathode activating substance film 40 was analyzed by X-ray photoelectron spectroscopy (XPS) in the same manner as for Sample 1-1. The composition of the single-layer film similar to the cathode activating substance film 40 was $Li_{3.2}Cu_{0.6}PO_{3.5}N_{0.3}$. On the other hand, no crystal grains were found in the TEM image when this single-layer film was observed with a transmission electron microscope (TEM). Instead, a halo ring indicating amorphousness was observed in the electron diffraction image. As a result, it was verified that the cathode activating substance film 40 was amorphous.

(Charge/Discharge Test)

Figure 13:
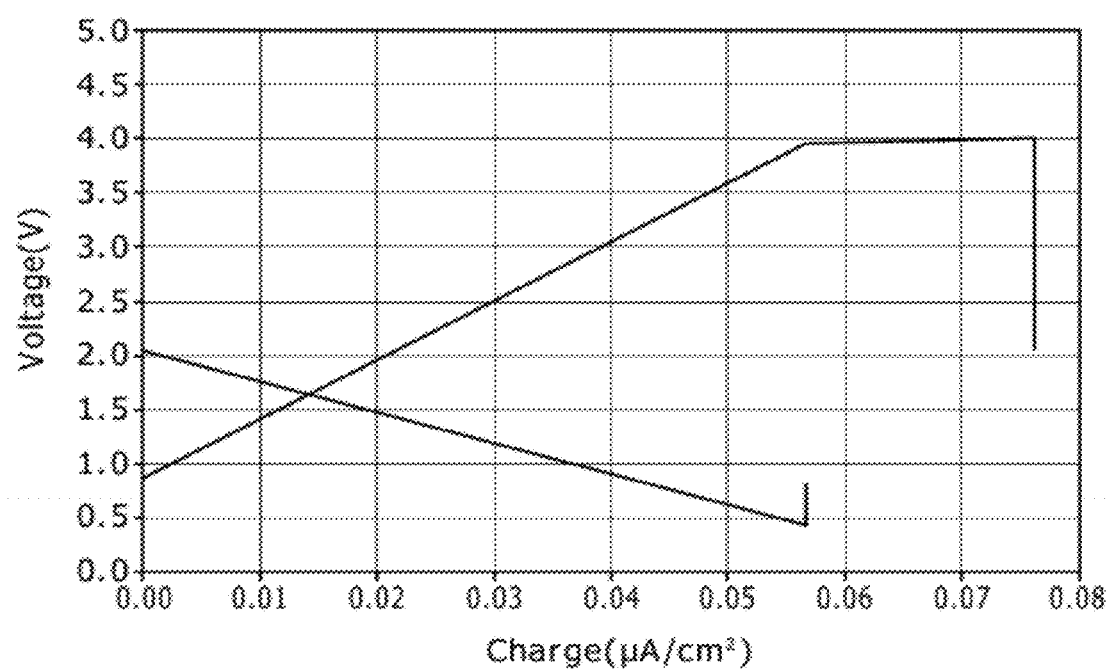
FIG. 13 is a graph illustrating charge and discharge curves.

The solid-state electrolyte battery of Sample 1-5 was subjected to a charge/discharge test. The charge was conducted at a charge current of 30 μA and a charge cutoff voltage of 4.5 V, and the discharge at a discharge current of 30 μA and a discharge cutoff voltage of 0.5 V. It should be noted that 30 μA is equivalent to 2 C (current at which the theoretical capacity is charged or discharged in half an hour). FIG. 13 illustrates the measurement result.

As illustrated in FIG. 13, the charge and discharge curves show a linear change in voltage with no flatness similar to a capacitor behavior with a battery capacity of 0.1 μAh/cm² or less. As a result, the battery was hardly functional as such.

Therefore, the copper composition ratio y in $Li_xCu_yPO_{4-z}N_z$ making up the cathode activating substance film 40 has to be adequately high. In Sample 1-2, on the other hand, the copper composition ratio y in $Li_xCu_yPO_{4-z}N_z$ making up the cathode activating substance film 40 is 1.0, and this composition ratio y provides excellent characteristics. Therefore, it is preferred that the copper composition ratio y in $Li_xCu_yPO_{4-z}N_z$ making up the cathode activating substance film 40 should be 1.0 or higher.

<Sample 2-1>

A solid-state electrolyte battery whose configuration is shown in FIGS. 1A to 1C was fabricated. A 1.1 mm-thick polycarbonate (PC) substrate was used as the substrate 10. An SCZ was formed as the inorganic insulting film 20 on the entire surface of the substrate 10.

A metallic mask was placed on the inorganic insulting film 20, and then the cathode-side current collector film 30, cathode activating substance film 40, solid-state electrolyte film 50 and anode-side current collector film 70 were formed in this order in a given region, thus forming a laminated body. A Ti film was formed as the cathode-side current collector film 30, a $Li_xFe_yPO_{4-z}N_z$ film as the cathode activating substance film 40, a $Li_3PO_4N_x$ as the solid-state electrolyte film 50 and Cu and Ti films were formed as the anode-side current collector film 70. The conditions for forming the inorganic insulting film 20 and each of the thin films making up the laminated body were as described below. It should be noted that the substrate 10 was not heated, and that the substrate holder was cooled instead by water at 20° C. for film formation.

The conditions for forming the inorganic insulting film 20 and each of the thin films making up the laminated body were as described below.

[Inorganic Insulting Film 20]

The inorganic insulting film 20 was formed by the following sputtering apparatus under the following conditions:

Sputtering apparatus (C-3103 by ANELVA)

Target composition: SCZ ($SiO_2$ 35 at % (atomic percent)+ $Cr_2O_3$ 30 at %+$ZrO_2$ 35 at %)

Target size: Φ6 inches

Sputtering gas: Ar 100 sccm, 0.13 Pa

Sputtering power: 1000 W (RF)

[Cathode-Side Current Collector Film 30]

The cathode-side current collector film 30 was formed by the following sputtering apparatus under the following conditions:

Sputtering apparatus (SMO-01 special model by ULVAC, Inc.)

Target composition: Ti

Target size: Φ4 inches

Sputtering gas: Ar 70 sccm, 0.45 Pa

Sputtering power: 1000 W (DC)

Film thickness: 100 nm

[Cathode Activating Substance Film 40]

Figure 14:
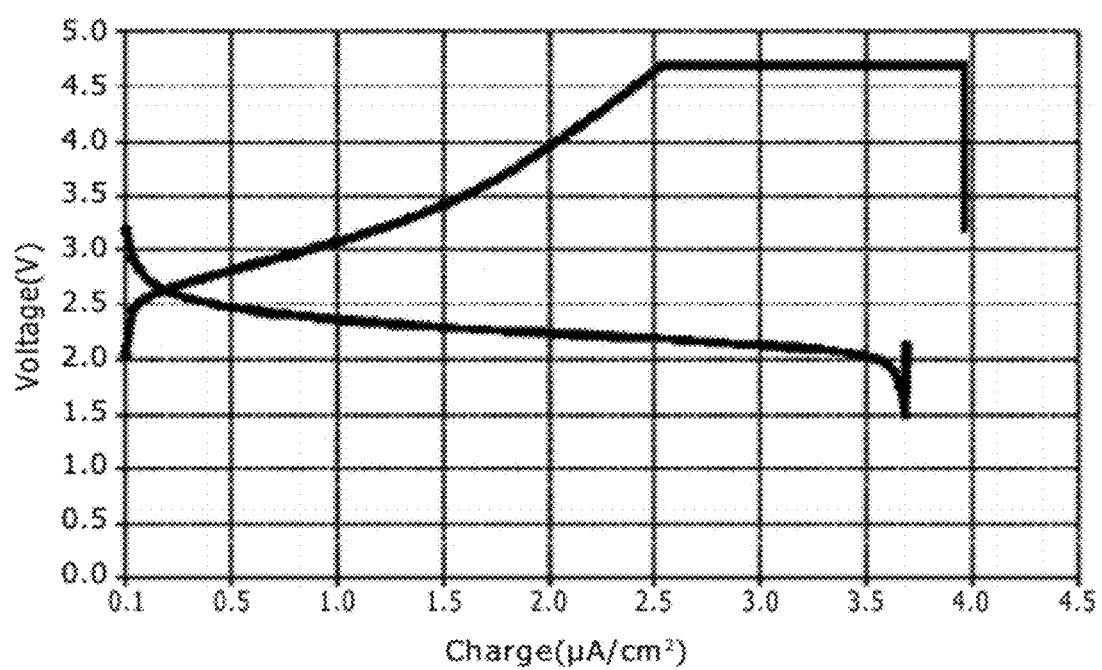
FIG. 14 is a graph illustrating charge and discharge curves.
Figure 15:
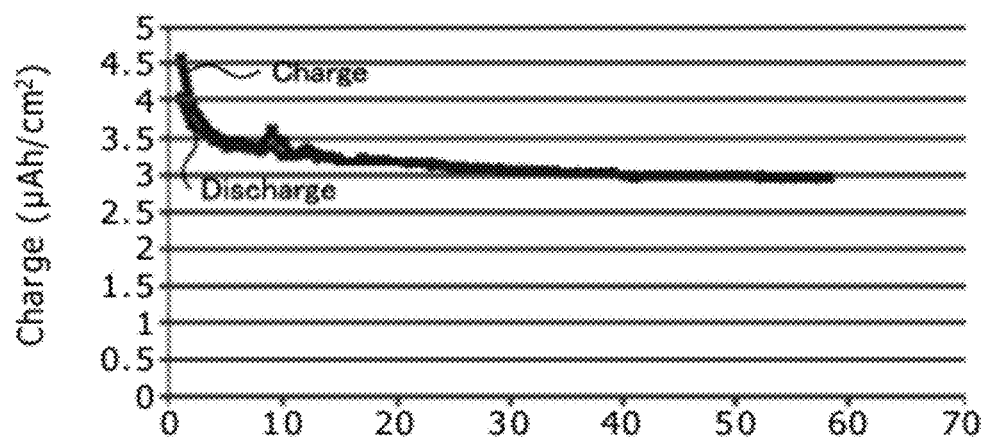
FIG. 15 is a graph plotting charge and discharge capacities versus cycle count.
Figure 16:
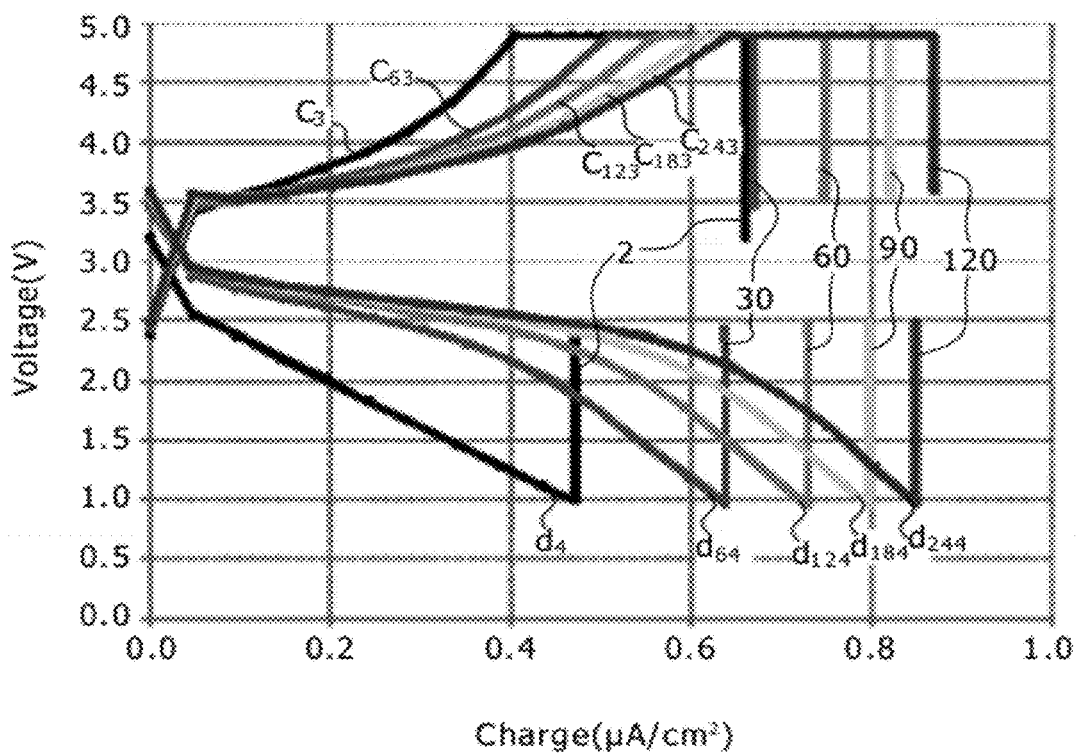
FIG. 16 is a graph illustrating charge and discharge curves.

The cathode activating substance film 30 was formed by the following sputtering apparatus under the following conditions:

Sputtering apparatus (SMO-01 special model by ULVAC, Inc.)
Target composition: LiFePO$_4$
Target size: Φ4 inches
Sputtering gas: Ar 20 sccm+N$_2$ 20 sccm, 0.26 Pa
Sputtering power: 300 W (RF)
Film thickness: 210 nm
[Solid-State Electrolyte Film 50]
The solid-state electrolyte film 50 was formed by the following sputtering apparatus under the following conditions:
Sputtering apparatus (SMO-01 special model by ULVAC, Inc.)
Target composition: Li$_3$PO$_4$
Target size: Φ4 inches
Sputtering gas: Ar 20 sccm+N$_2$ 20 sccm, 0.26 Pa
Sputtering power: 600 W (RF)
Film thickness: 480 nm
[Anode-Side Current Collector Film 70]
The anode-side current collector film 70 (Cu film) was formed by the following sputtering apparatus under the following conditions:
Sputtering apparatus (SMO-01 special model by ULVAC, Inc.)
Target composition: Cu
Target size: Φ4 inches
Sputtering gas: Ar 70 sccm, 0.45 Pa
Sputtering power: 500 W (DC)
Film thickness: 20 nm
The anode-side current collector film 70 (Ti film) was formed by the following sputtering apparatus under the following conditions:
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 250 nm
Finally, the overall protective film 80 was formed using ultraviolet-hardening resin (by Sony Chemicals & Information Devices, model No. SK3200), and further, the inorganic insulting film 20 was formed on the overall protective film 80 (under the same conditions as described above). As a result, the solid-state electrolyte battery of Sample 2-1 was obtained. That is, the solid-state electrolyte battery of Sample 2-1 made of the following films was obtained:
Film configuration of the solid-state electrolyte battery:
Polycarbonate substrate/SCZ (50 nm)/Ti (100 nm)/Li$_x$Fe$_y$PO$_{4-z}$N$_z$ (210 nm)/Li$_3$PO$_4$N$_x$ (480 nm)/Cu (20 nm)/Ti (250 nm)/ultraviolet-hardening resin (20 μm)/SCZ (50 nm)
(Analysis of the Cathode Activating Substance Film 40)
The composition of the cathode activating substance film 40 was analyzed by X-ray photoelectron spectroscopy (XPS) in the same manner as for Sample 1-1. The composition of the single-layer film similar to the cathode activating substance film 40 was LiFePO$_{3.3}$N$_{0.7}$. On the other hand, no crystal grains were found in the TEM image when this single-layer film was observed with a transmission electron microscope (TEM). Instead, a halo ring indicating amorphousness was observed in the electron diffraction image. As a result, it was verified that the cathode activating substance film 40 was amorphous.
(Charge/Discharge Test)
The solid-state electrolyte battery of Sample 2-1 was subjected to a charge/discharge test. The charge was conducted at a charge current of 30 μA and a charge cutoff voltage of 4.5 V, and the discharge at a discharge current of 30 μA and a discharge cutoff voltage of 0.5 V. It should be noted that 30 μA is equivalent to 2 C (current at which the theoretical capacity is charged or discharged in half an hour). FIG. 14 illustrates the measurement result. Further, FIG. 15 illustrates a graph plotting charge and discharge capacities versus cycle count.
As illustrated in FIG. 14, although the charge and discharge capacities are low, the discharge curve has a flat area at a voltage of 2 V or above. As a result, it was verified that the battery was properly driven. As illustrated in FIG. 15, on the other hand, the battery retained 80% of its capacity up until 50 cycles.
<Sample 2-2>
The solid-state electrolyte battery of Sample 2-2 was fabricated in the same manner as that of Sample 2-1 except that the cathode activating substance film 40 was formed under the conditions given below.
[Cathode Activating Substance Film 40]
The cathode activating substance film 40 was formed on the cathode-side current collector film 30 under the following conditions:
Sputtering apparatus (SMO-01 special model by ULVAC, Inc.)
Target composition: LiFePO$_4$
Target size: Φ4 inches
Sputtering gas: Ar 20 sccm, 0.15 Pa
Sputtering power: 300 W (RF)
Film thickness: 260 nm
Sample 2-2 is the same solid-state electrolyte battery as Sample 2-1 except that LiFePO$_4$ was not doped with nitrogen at the time of forming the cathode activating substance film 40. That is, Sample 2-2 is a solid-state electrolyte battery fabricated to show that the fact that the cathode activating substance film 40 (Li$_x$Fe$_y$PO$_{4-z}$N$_z$) formed without annealing is functional in an amorphous state is a unique phenomenon. It should be noted that it is known that LiFePO$_4$ has a significantly high internal impedance and cannot drive the battery properly unless ground into fine particles of the order of several tens of nm even if it is a crystalline material.
(Charge/Discharge Test)
The solid-state electrolyte battery of Sample 2-2 was subjected to a charge/discharge test. The charge was conducted at a charge current of 30 μA and a charge cutoff voltage of 4.5 V, and the discharge at a discharge current of 30 μA and a discharge cutoff voltage of 0.5 V. It should be noted that 30 μA is equivalent to 2 C (current at which the theoretical capacity is charged or discharged in half an hour). FIG. 16 illustrates the measurement result.
As illustrated in FIG. 16, it is clear that Sample 2-2 is, first of all, significantly smaller in capacity than Sample 2-1, and that not enough lithium is extracted. Further, the battery capacity increases gradually after two, 30, 60, 90 and 120 cycles. The reason for this is probably that because the crystallization progresses by a repetition of charge and discharge, the battery capacity has increased due to reduced impedance.

4. Other Embodiments

The present invention is not limited to the above embodiments but may be modified or applied in various ways without departing from the scope thereof. For example, the films making up the solid-state electrolyte battery are not limited to those described above. For example, the inorganic insulating film 20 may be omitted in the first to third embodiments.
Further, a plurality of laminated bodies may be stacked one on top of the other in sequence, electrically connected together in series and covered with the overall protective film 80. Still further, a plurality of laminated bodies may be arranged side by side on the substrate, electrically connected together in parallel or in series and covered with the overall protective film 80.

On the other hand, the structure of the solid-state electrolyte battery is not limited to those described above. The present invention is applicable, for example, to a solid-state electrolyte battery in which the cathode-side current collector film 30 is omitted by using the substrate 10 made of a conductive material.

Further, the cathode-side current collector film 30 may be, for example, made of a metallic plate which is made of a cathode current collector material. The anode-side current collector film 70 may be made of a metallic plate which is made of an anode current collector material.

The invention claimed is:

1. A solid-state electrolyte battery comprising: a cathode-side layer having a cathode activating substance layer; an anode-side layer; and a solid-state electrolyte layer formed between the cathode-side layer and anode-side layer, wherein the cathode activating substance layer is a completely amorphous single-phase thin film that does not contain any crystalline phase and is formed by sputtering or vacuum vapor deposition of lithium phosphate compound particles, and the cathode activating substance layer contains a lithium complex oxide in an amorphous state expressed by:

$$Li_xM_yPO_{4-z}N_z \qquad \text{Formula (1)}$$

wherein M is at least one transition metal; wherein x is a composition ratio of lithium, wherein $0.5 \leq x \leq 5.0$; wherein y is a composition ratio of M, wherein $1.0 \leq y \leq 3.2$; wherein z is a composition ratio of nitrogen, wherein $0.3 \leq z \leq 0.7$, and wherein the transition metal is iron (Fe) or copper (Cu).

2. The solid-state electrolyte battery of claim 1, wherein the anode-side layer includes an anode-side current collector layer and anode potential formation layer, and a lithium excess layer is formed at the anode-side interface of the solid-state electrolyte layer at the time of charging.

3. The solid-state electrolyte battery of claim 1, wherein the anode-side layer includes an anode-side current collector layer and anode activating substance layer.

4. The solid-state electrolyte battery of claim 1, wherein the cathode-side layer, the anode-side layer, and the solid-state electrolyte layer include thin films.

5. A cathode activating substance comprising: lithium phosphate compound particles having an olivine crystal structure; and a coating layer formed at least in part of a surface of the lithium phosphate compound particles, wherein the coating layer is a completely amorphous single-phase thin film that does not contain any crystalline phase and is formed by sputtering or vacuum vapor deposition of lithium phosphate compound particles, and the coating layer is made of a lithium complex oxide in an amorphous state expressed by:

$$Li_xFe_yPO_{4-z}N_z \qquad \text{Formula (2)}$$

wherein x is a composition ratio of lithium, wherein $0.5 \leq x \leq 5.0$; wherein y is a composition ratio of iron, wherein $1.0 \leq y \leq 3.2$; wherein z is a composition ratio of nitrogen, wherein $0.3 \leq z \leq 0.7$, and wherein the transition metal is iron (Fe) or copper (Cu).

6. A solid-state electrolyte battery comprising: a cathode-side layer having a cathode activating substance layer; an anode-side layer; and a solid-state electrolyte layer formed between the cathode-side layer and anode-side layer, wherein the cathode activating substance layer is in direct contact with the solid-state electrolyte layer, and wherein the cathode activating substance layer is a completely amorphous single-phase thin film that does not contain any crystalline phase and is formed by sputtering or vacuum vapor deposition of lithium phosphate compound particles, and the cathode activating substance layer contains a lithium complex oxide in an amorphous state expressed by:

$$Li_xM_yPO_{4-z}N_z \qquad \text{Formula (1)}$$

wherein M is at least one transition metal; wherein x is a composition ratio of lithium, wherein $0.5 \leq x \leq 5.0$; wherein y is a composition ratio of M, wherein $1.0 \leq y \leq 3.2$; and wherein z is a composition ratio of nitrogen, wherein $0.3 \leq z \leq 0.7$, and wherein the transition metal is iron (Fe) or copper (Cu).

7. The solid-state electrolyte battery of claim 1, wherein the solid-state electrolyte layer contains an amorphous material.

8. The solid-state electrolyte battery of claim 7, wherein the amorphous material is one of LiPON and LiBON.

9. The solid-state electrolyte battery of claim 7, wherein the amorphous material is in direct contact with the cathode activating substance layer containing the lithium complex oxide in the amorphous state expressed by:

$$Li_xM_yPO_{4-z}N_z \qquad \text{Formula (1)}$$

wherein M is at least one transition metal; wherein x is the composition ratio of lithium, wherein $0.5 \leq x \leq 5.0$; wherein y is the composition ratio of M, wherein $1.0 \leq y \leq 3.2$; and wherein z is the composition ratio of nitrogen, and wherein $0.3 \leq z \leq 0.7$.

10. The solid-state electrolyte battery of claim 1, wherein the cathode activating substance layer has a higher potential than a potential of Li+/Li.

11. The solid-state electrolyte battery of claim 1, wherein the cathode activating substance layer has an initial state in the solid-state electrolyte battery of not annealed.

12. The cathode activating substance of claim 5, wherein the coating layer is formed without annealing.

* * * * *